US012609829B2

(12) United States Patent
Lu et al.

(10) Patent No.: US 12,609,829 B2
(45) Date of Patent: Apr. 21, 2026

(54) METHOD AND APPARATUS FOR VERIFYING SRv6 PACKET

(71) Applicant: HUAWEI TECHNOLOGIES CO., LTD., Shenzhen (CN)

(72) Inventors: Dongjie Lu, Shenzhen (CN); Rui Gu, Beijing (CN); Huizhi Wen, Beijing (CN); Yaqun Xiao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 376 days.

(21) Appl. No.: 17/990,474

(22) Filed: Nov. 18, 2022

(65) Prior Publication Data

US 2023/0102984 A1     Mar. 30, 2023

Related U.S. Application Data

(63) Continuation of application No. PCT/CN2021/079919, filed on Mar. 10, 2021.

(30) Foreign Application Priority Data

May 19, 2020   (CN) .......................... 202010424481.4
May 29, 2020   (CN) .......................... 202010476797.8

(51) Int. Cl.
| | |
|---|---|
| *G06F 9/00* | (2018.01) |
| *G06F 15/16* | (2006.01) |
| *G06F 17/00* | (2019.01) |
| *H04L 9/32* | (2006.01) |
| *H04L 9/40* | (2022.01) |

(52) U.S. Cl.
CPC ........ *H04L 9/3242* (2013.01); *H04L 63/0236* (2013.01); *H04L 63/029* (2013.01); *H04L 63/20* (2013.01)

(58) Field of Classification Search
CPC .... H04L 63/0236; H04L 63/20; H04L 63/029
USPC .......................................................... 726/11
See application file for complete search history.

(56) References Cited

U.S. PATENT DOCUMENTS

| | | | |
|---|---|---|---|
| 10,736,029 B1* | 8/2020 | Young ..................... | H04W 8/26 |
| 2018/0316723 A1* | 11/2018 | Murgia ............... | H04L 63/0428 |
| 2019/0394211 A1* | 12/2019 | Filsfils ................ | H04L 45/7453 |

OTHER PUBLICATIONS

Filsfils et al., "IPV6 Segment Routing Header (SRH)," RFC 8754, Total 27 pages, Internet Engineering Task Force (Mar. 2020).
Krawczyk et al., "HMAC: Keyed-Hashing for Message Authentication," RFC 2104, Total 11 pages (Feb. 1997).
Kent et al., "IP Authentication Header," RFC 4302, Total 34 pages (Dec. 2005).

(Continued)

*Primary Examiner* — Jeffrey C Pwu
*Assistant Examiner* — Samuel Ambaye
(74) *Attorney, Agent, or Firm* — Leydig, Voit & Mayer, Ltd.

(57) ABSTRACT

Embodiments of this application disclose a method for verifying an SRv6 packet. An egress node of an IPsec tunnel may receive an SRv6 packet, where the SRv6 packet is a packet encapsulated in an IPsec transport mode. The SRv6 packet includes an AH and at least one SRH. The SRv6 packet carries first indication information, where the first indication information indicates the egress node to perform AH verification on the SRv6 packet. A verification range of the AH verification includes the at least one SRH.

20 Claims, 14 Drawing Sheets

(56) References Cited

OTHER PUBLICATIONS

Deering et al., "Internet Protocol, Version 6 (IPv6) Specification," RFC 8200, Total 42 pages (Jul. 2017).

Li et al., "Security Considerations for SRv6 Networks draft-li-spring-srv6-security-consideration-03," Total 24 pages (Nov. 4, 2019).

Filsfils et al., "SRv6 Network Programming draft-filsfils-spring-srv6-network-programming-07," Total 83 pages (Feb. 14, 2019).

Kent et al., "IP Encapsulating Security Payload (ESP)," RFC 4303, Total 44 pages Dec. 2005).

Deering et al., "Internet Protocol, Version 6 (IPv6) Specification," RFC 2460, Total 39 pages (Dec. 1998).

* cited by examiner

| Version | Traffic class | Flow label | | |
|---|---|---|---|---|
| Payload length | | Next layer header Next=43 | Hop limit | |
| Source address | | | | |
| Destination address | | | | |
| Next layer header | Extension header length Hdr Ext Len | Routing type | Quantity of route segments left Segment Left (SL) | |
| Maximum identifier of a segment list Last Entry | Flag | Tag of a data packet of a same type Tag | | |
| Segment list Segment list [0] | | | | |
| ... | | | | |
| Segment list Segment list [n] | | | | |
| Type | Length | Compression D | Reserved | |
| Keyed hashed message authentication code key identifier HMAC Key ID | | | | |
| Keyed hashed message authentication code HMAC | | | | |
| Payload | | | | |

IPv6 header

Segment routing header SRH

FIG. 2

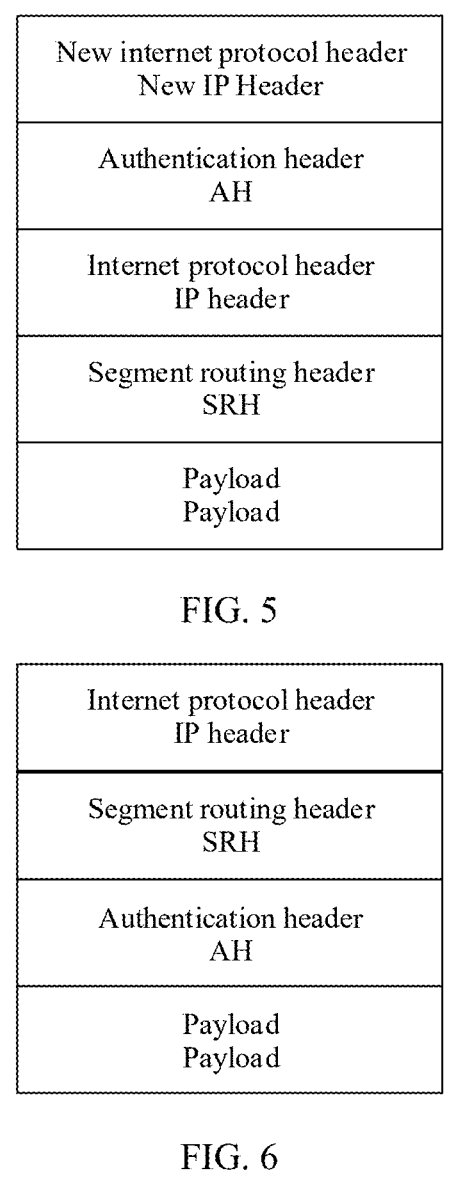

| New internet protocol header<br>New IP Header |
| Authentication header<br>AH |
| Internet protocol header<br>IP header |
| Segment routing header<br>SRH |
| Payload<br>Payload |

FIG. 5

| Internet protocol header<br>IP header |
| Segment routing header<br>SRH |
| Authentication header<br>AH |
| Payload<br>Payload |

FIG. 6

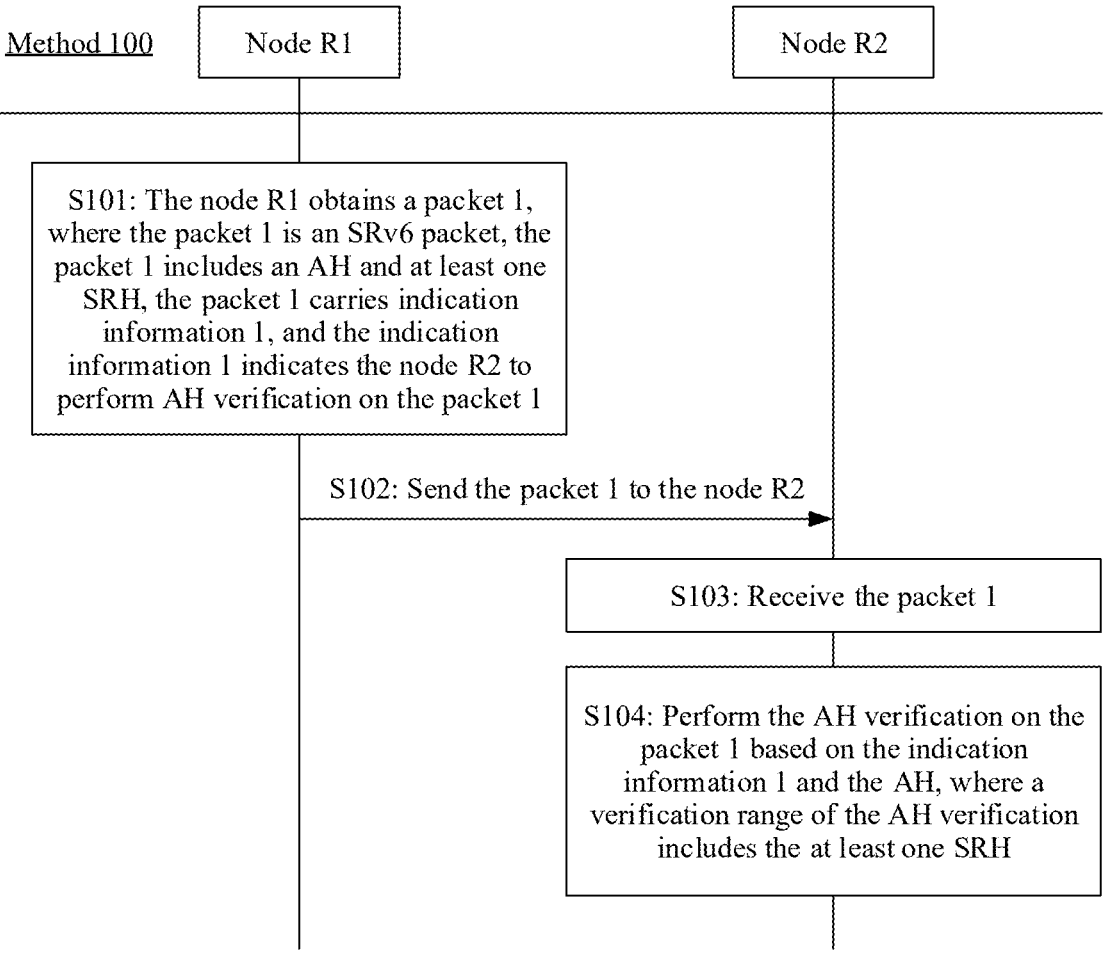

Method 100    Node R1    Node R2

S101: The node R1 obtains a packet 1, where the packet 1 is an SRv6 packet, the packet 1 includes an AH and at least one SRH, the packet 1 carries indication information 1, and the indication information 1 indicates the node R2 to perform AH verification on the packet 1

S102: Send the packet 1 to the node R2

S103: Receive the packet 1

S104: Perform the AH verification on the packet 1 based on the indication information 1 and the AH, where a verification range of the AH verification includes the at least one SRH

FIG. 7

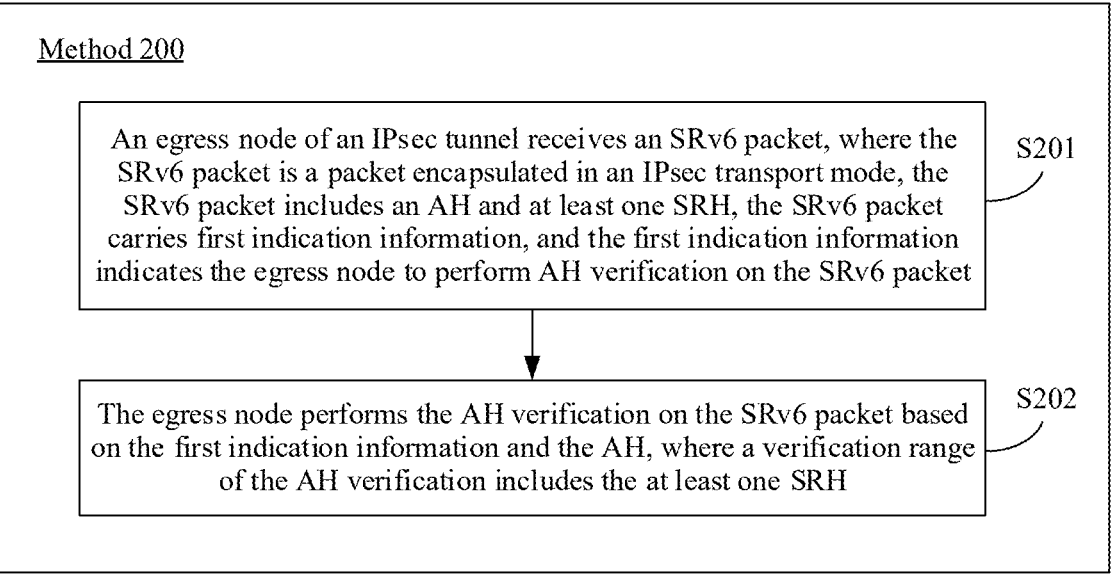

Method 200

An egress node of an IPsec tunnel receives an SRv6 packet, where the
SRv6 packet is a packet encapsulated in an IPsec transport mode, the
SRv6 packet includes an AH and at least one SRH, the SRv6 packet
carries first indication information, and the first indication information
indicates the egress node to perform AH verification on the SRv6 packet

S201

The egress node performs the AH verification on the SRv6 packet based
on the first indication information and the AH, where a verification range
of the AH verification includes the at least one SRH

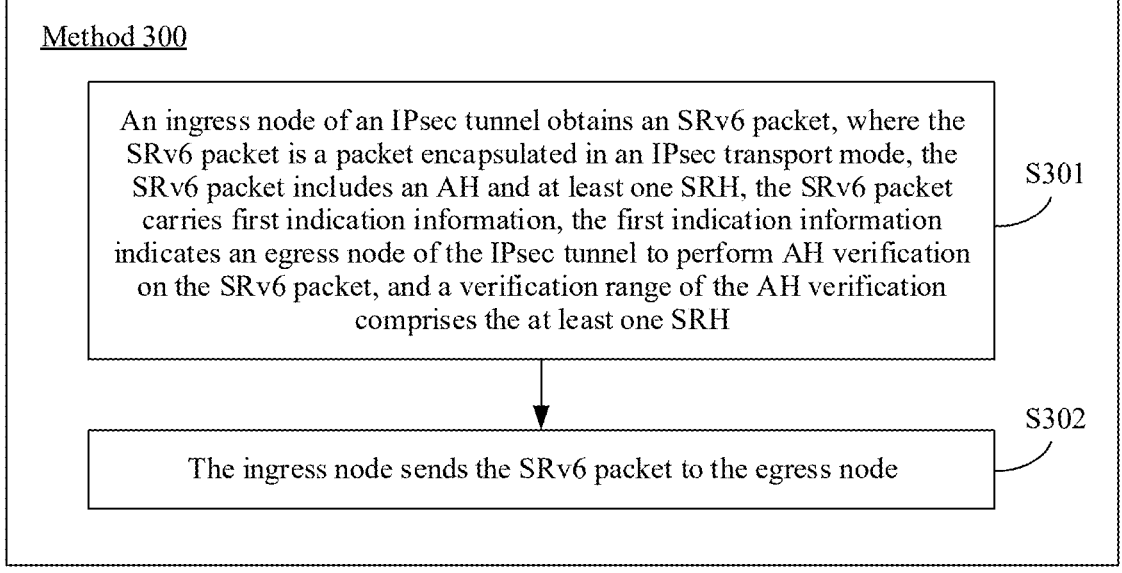

Method 300

An ingress node of an IPsec tunnel obtains an SRv6 packet, where the
SRv6 packet is a packet encapsulated in an IPsec transport mode, the
SRv6 packet includes an AH and at least one SRH, the SRv6 packet
carries first indication information, the first indication information
indicates an egress node of the IPsec tunnel to perform AH verification
on the SRv6 packet, and a verification range of the AH verification
comprises the at least one SRH

S301

The ingress node sends the SRv6 packet to the egress node

1100
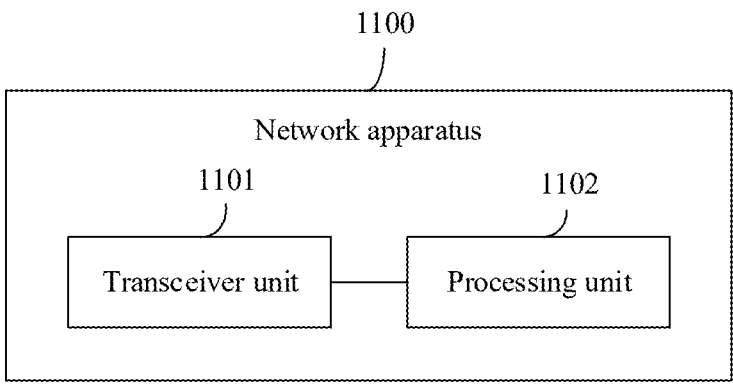
FIG. 11
1200
FIG. 12
1300
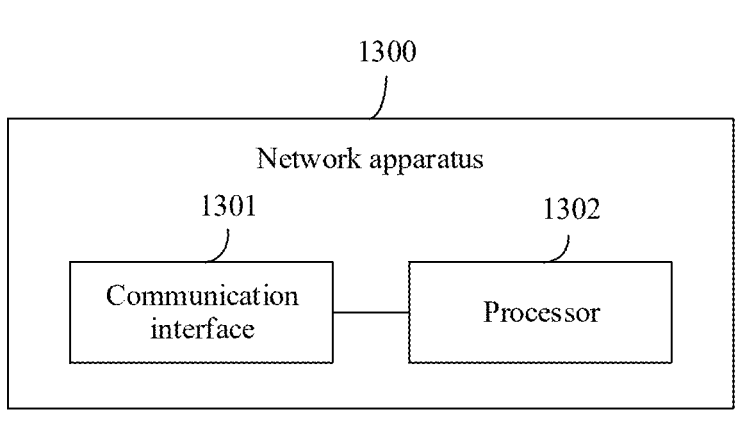
FIG. 13

1400

1500

METHOD AND APPARATUS FOR VERIFYING SRv6 PACKET

CROSS-REFERENCE TO RELATED APPLICATIONS

This application is a continuation of International Application No. PCT/CN2021/079919, filed on Mar. 31, 2021, which claims priority to Chinese Patent Application No. 202010476797.8, filed on May 29, 2020, and Chinese Patent Application No. 202010424481.4, filed on May 19, 2020. All of the aforementioned applications are hereby incorporated by reference in their entireties.

TECHNICAL FIELD

Embodiments of this application relate to the communication field, and in particular, to a method and an apparatus for verifying an SRv6 packet.

BACKGROUND

With a segment routing over Internet Protocol version 6 (SRv6) technology, a segment routing (SR) technology may be applied to forward an Internet Protocol version 6 (IPv6) packet.

Currently, security risks exist in forwarding a packet by using the SRv6 technology.

SUMMARY

Embodiments of this application provide a method and an apparatus for verifying an SRv6 packet, to reduce security risks when a packet is forwarded by using an SRv6 technology.

According to a first aspect, an embodiment of this application provides a method for verifying an SRv6 packet. The method may be performed by an egress node of an IPv6 Internet Protocol security (IPsec) tunnel, to verify whether an SRv6 packet transmitted in the IPsec tunnel is tampered with. Optionally, the egress node receives the SRv6 packet, where the SRv6 packet is a packet encapsulated in an IPsec transport mode. The SRv6 packet includes a segment routing header (SRH) and an authentication header (AH). In this embodiment of this application, the SRv6 packet carries first indication information, where the first indication information indicates the egress node to perform AH verification on the SRv6 packet. After receiving the SRv6 packet, the egress node may not only use the SRH to guide SRv6 packet forwarding, but also perform AH verification on the SRv6 packet based on the first indication information and the AH. In this embodiment of this application, a verification range of the AH verification includes at least one SRH. It can be learned that, by applying the solution in this embodiment of this application, the SRv6 packet may be encapsulated in the IPsec transport mode, and the at least one SRH of the SRv6 packet is verified by using the AH verification. Compared with verifying an SRH by using HMAC verification, the method may reduce resource consumption caused by verifying the SRH, prevent a replay attack, support key agreement, and prevent a network hacker from performing a network attack in a manner of newly adding an SRH. Compared with verifying, by using AH verification, an SRv6 packet encapsulated in an IPsec tunnel mode, in the method, the at least one SRH of the SRv6 packet may be verified when the SRH is used to forward the SRv6 packet. Compared with a conventional method for verifying, by using AH verification, an IPv6 packet encapsulated in an IPsec transport mode, in the method, the at least one SRH may be verified. The method may be used to prevent a network hacker from performing a network attack by using an SRH. The performing the network attack by using the SRH mentioned herein includes tampering with the SRH and/or inserting a new SRH to perform the network attack.

In addition, verifying an SRH by using the AH authentication may further support key agreement and prevent a replay attack.

In an implementation, the egress node of the IPsec tunnel is a transit node on an SRv6 packet forwarding path.

In an implementation, in the IPsec tunnel, the SRv6 packet is forwarded based on the SRH.

In an implementation, the first indication information in the SRv6 packet may be carried in the SRH.

In an implementation, considering that meanings of some reserved fields in the SRH are not clearly specified, the foregoing first indication information may be carried in the reserved field of the SRH. In addition, the SRH further has an extended TLV field used to carry information. Therefore, the foregoing first indication information may be further carried in the extended TLV field of the SRH.

In an implementation, a flag field is the reserved field of the SRH, and a meaning of the flag field is not clearly specified. Therefore, the first indication information may be carried in the flag field of the SRH.

In an implementation, when the egress node that receives the SRv6 packet determines how to process the SRv6 packet, the egress node parses a destination address of the SRv6 packet. For example, if determining that the destination address is an address of the egress node, the egress node continues to parse an SRH header, to determine a next hop for forwarding the packet. For another example, if determining that the destination address is not an address of the egress node, the egress node continues to forward the packet to a node indicated by the destination address. Therefore, the first indication information may be carried in the destination address of the SRv6 packet. In this way, the egress node may obtain the first indication information when parsing the destination address, and does not need to parse another field.

In an implementation, the destination address of the SRv6 packet includes 128 bits, and the 128 bits may include three fields: locator, function, and arguments. Both the function and arguments fields are used to carry behavior corresponding to the locator. Therefore, the arguments field or the function field of the destination address may be used to carry the first indication information.

In an implementation, the egress node stores a correspondence between the destination address and the first indication information, so that an objective of carrying the first indication information in the destination address of the SRv6 packet is achieved. The egress node may obtain the first indication information based on the correspondence.

In an implementation, the destination address of the SRv6 packet is a first SID, and the first SID is an SID or a BSID of the egress node. After receiving the SRv6 packet, the egress node may determine whether a mapping relationship including the first SID exists locally, to obtain the first indication information. Alternatively, the first indication information may be obtained based on the arguments field or the function field of the first SID.

In an implementation, the destination address of the SRv6 packet is a second SID, and the second SID is associated with the IPsec tunnel. In an example, the second SID is an egress IP address of the IPsec tunnel. After receiving the SRv6 packet, the egress node may determine whether a mapping relationship including the second SID exists locally, to obtain the first indication information. Alternatively, the first indication information may be obtained based on the arguments field or the function field of the second SID.

In an implementation, the SRv6 packet includes second indication information, and the second indication information indicates that the verification range of the AH verification includes the SRH. After receiving the SRv6 packet, the egress node may determine, based on the first indication information, that the AH verification on the SRv6 packet is needed; and the egress node may determine, based on the second indication information, that the verification range of the AH verification includes the at least one SRH.

In an implementation, the foregoing second indication information may be carried in the AH.

In an implementation, considering that meanings of some reserved fields in the AH are not clearly specified, the foregoing second indication information may be carried in the reserved field of the AH.

In an implementation, that the egress node performs the AH verification on the SRv6 packet based on the first indication information and the AH includes:

the egress node performs the AH verification on the SRv6 packet based on the first indication information, the second indication information, and the AH.

In an implementation, in addition to the at least one SRH, the verification range of the AH verification may further include a payload of the SRv6 packet, to prevent a network hacker from tampering with the payload to perform a network attack.

In an implementation, in addition to the at least one SRH, the verification range of the AH verification may further include an IPv6 packet header of the SRv6 packet, to prevent a network hacker from tampering with the IPv6 packet header to perform a network attack.

In an implementation, the egress node of the IPsec tunnel is an ingress node of an SRv6 trusted domain. In this case, this solution may be used to ensure security of the SRv6 packet forwarded to the trusted domain, thereby effectively preventing the trusted domain from being attacked.

In an implementation, the SRv6 packet includes a plurality of SRHs, and the range of the AH verification includes the plurality of SRHs. The verification range of the AH verification includes all SRHs in the SRv6 packet. This may effectively prevent a network hacker from performing a network attack by newly adding an SRH. In addition, this may also prevent a network hacker from performing a network attack by tampering with an original SRH.

In an implementation, when the egress node determines that the SRv6 packet passes the AH verification, it indicates that security of the SRv6 packet is ensured to some extent, where at least the SRH is not tampered with, and a network hacker does not insert a new SRH. Therefore, the egress node may continue to forward the SRv6 packet. Correspondingly, if the SRv6 packet fails the AH verification, it indicates that the SRv6 packet is an attack packet. If the SRv6 packet continues to be transmitted in a network, network security is affected. Therefore, the egress node may discard the SRv6 packet to ensure network security.

According to a second aspect, an embodiment of this application provides a method for verifying an SRv6 packet. The method may be executed by an ingress node of an IPsec tunnel. Specifically, the ingress node may obtain an SRv6 packet. The SRv6 packet may be a packet that is obtained by the ingress node by encapsulating a received initial packet. The SRv6 packet is a packet encapsulated in an IPsec transport mode, where the SRv6 packet includes an SRH and an AH. The SRv6 packet carries first indication information, where the first indication information indicates an egress node to perform AH verification on the SRv6 packet, and a verification range of the AH verification includes at least one SRH. After obtaining the SRv6 packet, the ingress node may send the SRv6 packet to the egress node of the IPsec tunnel. In this way, the egress node may perform the AH verification on the SRv6 packet based on the first indication information. The verification range of the AH verification includes all SRHs in the SRv6 packet. This may prevent a network hacker from performing a network attack by using the SRH.

In an implementation, the ingress node of the IPsec tunnel is a head node on an SRv6 packet forwarding path.

In an implementation, the SRH carries the first indication information.

In an implementation, a reserved field or an extended type length value TLV field of the SRH is used to carry the first indication information.

In an implementation, the reserved field is a flag field.

In an implementation, a destination address of the SRv6 packet carries the first indication information.

In an implementation, an arguments field or a function field of the destination address carries the first indication information.

In an implementation, the egress node stores a correspondence between the destination address of the SRv6 packet and the first indication information.

In an implementation, the destination address of the SRv6 packet is a first segment identifier SID, and the first SID is an SID or a BSID of the egress node.

In an implementation, the destination address of the SRv6 packet is a second SID, and the second SID is associated with the IPsec tunnel.

In an implementation, the second SID is an egress IP address of the IPsec tunnel.

In an implementation, the SRv6 packet includes second indication information, and the second indication information indicates that the verification range of the AH verification includes the SRH.

In an implementation, the AH includes the second indication information.

In an implementation, a reserved field of the AH carries the second indication information.

In an implementation, the verification range of the AH verification further includes a payload of the SRv6 packet.

In an implementation, the verification range of the AH verification further includes an IP packet header of the SRv6 packet.

In an implementation, the egress node of the IPsec tunnel is an ingress node of an SRv6 trusted domain.

In an implementation, the SRv6 packet includes a plurality of SRHs, and the range of the AH verification includes the plurality of SRHs.

According to a third aspect, an embodiment of this application provides a network apparatus, used as an egress node of an Internet Protocol security IPsec tunnel. The network node includes:

a communication interface; and a processor, connected to the communication interface, where based on the communication interface and the processor, the egress node is configured to perform the method according to the first aspect and any one of the implementations of the first aspect.

According to a fourth aspect, an embodiment of this application further provides a network apparatus, used in an ingress node of an Internet Protocol security IPsec tunnel. The network node includes:

a communication interface; and a processor, connected to the communication interface, where based on the communication interface and the processor, the ingress node is configured to perform the method according to the second aspect and any one of the implementations of the second aspect.

According to a fifth aspect, an embodiment of this application provides a network apparatus, used in an egress node of an Internet Protocol security IPsec tunnel. The network node includes a memory and a processor.

The memory is configured to store program code.

The processor is configured to execute instructions in the program code, to enable the egress node to perform the method according to the first aspect and any one of the implementations of the first aspect.

According to a sixth aspect, an embodiment of this application provides a network apparatus, used in an ingress node of an Internet Protocol security IPsec tunnel. The ingress node includes a memory and a processor.

The memory is configured to store program code.

The processor is configured to execute instructions in the program code, to enable the ingress node to perform the method according to the second aspect and any one of the implementations of the second aspect.

The network apparatus provided in any one of the third aspect to the sixth aspect of this application may be, for example, a network device such as a router, a switch, or a packet switched network PTN device. Alternatively, the network apparatus may be a board, a line card, a chip configured to implement a related method, or the like in a network device. This is not specifically limited in this application.

According to a seventh aspect, an embodiment of this application provides a computer-readable storage medium, where the computer-readable storage medium stores instructions. When the instructions are executed on a computer, the computer is enabled to perform the method according to the first aspect or any one of the implementations of the first aspect, or the computer is enabled to perform the method according to the second aspect or any one of the implementations of the second aspect.

According to an eighth aspect, an embodiment of this application provides a communication system, including an ingress node of an Internet Protocol security IPsec tunnel and an egress node of the IPsec tunnel, where the egress node is configured to perform the method according to the first aspect or any one of the implementations of the first aspect.

According to a ninth aspect, an embodiment of this application provides a communication system, including an ingress node of an Internet Protocol security IPsec tunnel and an egress node of the IPsec tunnel, where the ingress node is configured to perform the method according to the second aspect or any one of the implementations of the second aspect.

According to a tenth aspect, an embodiment of this application provides a computer program product, including a computer program. When the computer program is executed on a computer, the computer is enabled to perform the method according to the first aspect or any one of the implementations of the first aspect, or the computer is enabled to perform the method according to the second aspect or any one of the implementations of the second aspect.

BRIEF DESCRIPTION OF DRAWINGS

To describe the technical solutions in embodiments of this application or in the conventional technology more clearly, the following briefly describes the accompanying drawings used to describe embodiments. It is clear that the accompanying drawings in the following descriptions show some embodiments of this application, and a person of ordinary skill in the art may still derive other drawings from these accompanying drawings without creative efforts.

FIG. 2 is a schematic diagram of a structure of another SRv6 packet according to an embodiment of this application;

FIG. 5 is a schematic diagram of a structure of an SRv6 packet encapsulated in a tunnel mode according to an embodiment of this application;

FIG. 6 is a schematic diagram of a structure of an SRv6 packet encapsulated in a transport mode according to an embodiment of this application;

FIG. 7 is a diagram of signaling exchange of a method for verifying an SRv6 packet according to an embodiment of this application;

FIG. 9 is a schematic flowchart of a method for verifying an SRv6 packet according to an embodiment of this application;

FIG. 10 is a schematic flowchart of a method for verifying an SRv6 packet according to an embodiment of this application;

FIG. 11 is a schematic diagram of a structure of a network apparatus according to an embodiment of this application;

FIG. 12 is a schematic diagram of a structure of a network apparatus according to an embodiment of this application;

FIG. 13 is a schematic diagram of a structure of a network apparatus according to an embodiment of this application;

DESCRIPTION OF EMBODIMENTS

Embodiments of this application provide a packet forwarding method, to reduce security risks that exist in forwarding a packet by using an SRv6 technology.

For ease of understanding, forwarding a packet by using the SRv6 technology is briefly described first.

Figure 1:
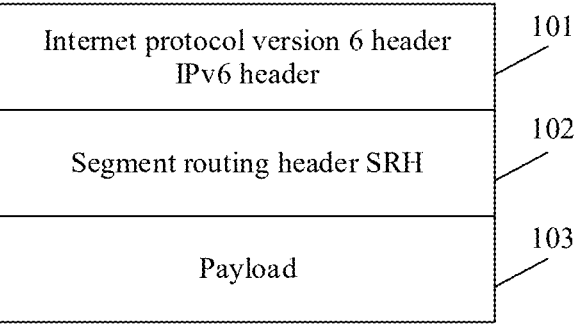
FIG. 1 is a schematic diagram of a structure of an SRv6 packet according to an embodiment of this application.

When the SRv6 technology is used to forward a packet, a head node specifies a packet forwarding path, and a transit node guides packet forwarding based on the forwarding path specified by the head node, until the packet is forwarded to a destination node. A packet forwarded by using the SRv6 technology may also be referred to as an SRv6 packet. Specifically, refer to FIG. 1 for understanding. FIG. 1 is a schematic diagram of a structure of an SRv6 packet according to an embodiment of this application. As shown in FIG. 1, the SRv6 packet includes an IPv6 header (IPv6 Header) 101, an SRH 102, and a payload 103. The SRH 102 includes a segment identifier list (SID list) indicating a packet forwarding path. In an implementation, the SID list may include several node SIDs, for example, include several IPv6 addresses. The node SID indicates a node through which a packet passes in a packet forwarding process. In another implementation, the SID list may include several adjacent link SIDs. The adjacent link SID indicates an adjacent link through which a packet is forwarded. The adjacent link refers to a direct link between two nodes. In still another implementation, the SID list may further include a node SID and an adjacent link SID.

When the SRv6 technology is used to forward a packet, the transit node forwards the packet based on the SID list and does not verify the SRH or the payload. Consequently, a network hacker may perform a network attack by maliciously tampering with the payload or the SRH, which affects network security.

Currently, an SRv6 trusted domain may be defined to prevent the network attack. The trusted domain indicates a network range for preventing the network attack. The trusted domain may be determined in a plurality of manners. For example, the trusted domain may be determined based on a network scenario. For example, a core network part in a network is specified as the trusted domain. Alternatively, the trusted domain may be determined based on a service type. For example, a network range of transmitting a specific service packet is determined as the trusted domain. Specifically, to ensure that the trusted domain is not attacked, an access control list (ACL) traffic filtering policy may be configured in an edge node or a transit node of the trusted domain. For example, the edge node of the trusted domain verifies a received SRv6 packet. If a destination address of the SRv6 packet is an address of a node in the trusted domain, the SRv6 packet is discarded. For another example, the edge node or the transit node of the trusted domain verifies a received SRv6 packet. If a source address of the SRv6 packet is an address of a node outside the trusted domain, the SRv6 packet is discarded. In the foregoing manner, an SRv6 packet generated outside the trusted domain may be prevented from being transmitted to the trusted domain, and an SRv6 packet generated in the trusted domain may be prevented from being forwarded outside the trusted domain. In this way, only the SRv6 packet generated in the trusted domain is forwarded, and the trusted domain is prevented from being attacked. The edge node of the trusted domain is a node that directly communicates with a node outside the trusted domain. The transit node of the trusted domain is a node other than the edge node.

However, in some scenarios, the SRv6 packet needs to be forwarded across trusted domains. For example, an SRv6 packet outside the trusted domain needs to be forwarded to the trusted domain, or an SRv6 packet generated in a first domain needs to be forwarded to a second domain via the trusted domain, where the first domain and the second domain are different from the trusted domain.

To ensure network security when an SRv6 packet is forwarded across trusted domains, the inventor of this application finds that key-related hashed-based message authentication code (HMAC) verification may be deployed on a transit node (for example, the edge node in the trusted domain) that forwards the SRv6 packet, to prevent a network attack caused by tampering with an SRH. An HMAC calculation may use a key and data as inputs, and compress the data into a data digest of a fixed length. Specifically, refer to FIG. 2 for understanding. FIG. 2 is a schematic diagram of a structure of another SRv6 packet according to an embodiment of this application. As shown in FIG. 2, an SRH includes an HMAC type length value (TLV), and the HMAC TLV includes an HMAC Key ID field and an HMAC field. The HMAC Key ID field identifies a key and a hash algorithm used in HMAC verification, and includes four bytes. The HMAC field indicates a data digest of a specific field in an SRv6 packet, and includes 32 bytes.

A specific field participating in HMAC calculation, a meaning of each field shown in FIG. 2, and a specific HMAC verification manner are not described in detail herein. For details, refer to a related description part of a request for comments (RFC) 8754.

Although the foregoing manner can be used to verify whether an SRH of a received SRv6 packet is tampered with, the HMAC verification consumes a large quantity of resources, which correspondingly affects performance of a node that performs the HMAC verification.

In addition, the HMAC verification supports verifying only a current SRH (such as the SRH 102 shown in FIG. 1). If a network hacker inserts a new SRH after the SRH 102 shown in FIG. 1, the HMAC verification does not verify the newly inserted SRH. The network hacker may still perform a network attack by tampering with the newly inserted SRH, which affects network security.

A verification range of the HMAC verification does not include a payload, either. Therefore, a network hacker may tamper with the payload to perform a network attack.

Further, the HMAC verification does not support key agreement. Consequently, a key may be leaked. Therefore, a specific key protection method is required to ensure key security. If there is no specific key protection solution, the key security cannot be ensured, and correspondingly, a result of the HMAC verification is unreliable. However, performing the key protection method occupies system resources of the node that performs the HMAC verification, which affects the performance of the node that performs the HMAC verification. Currently, the HMAC verification does not support anti-replay attack, either. Therefore, a network hacker may send a large quantity of replay attack packets, which consumes network resources.

In conclusion, deploying the HMAC verification on the network node that forwards the SRv6 packet cannot effectively ensure network security.

The inventor of this application further finds that an IPsec technology uses a security tunnel to protect data transmission in a network, and an IPv6 IPsec technology supports key agreement and anti-replay attack.

Specifically, an IPsec tunnel may be configured between two nodes. When a packet is transmitted in the IPsec tunnel, AH verification may be used to determine whether the packet transmitted in the IPsec tunnel is tampered with.

Figure 3:
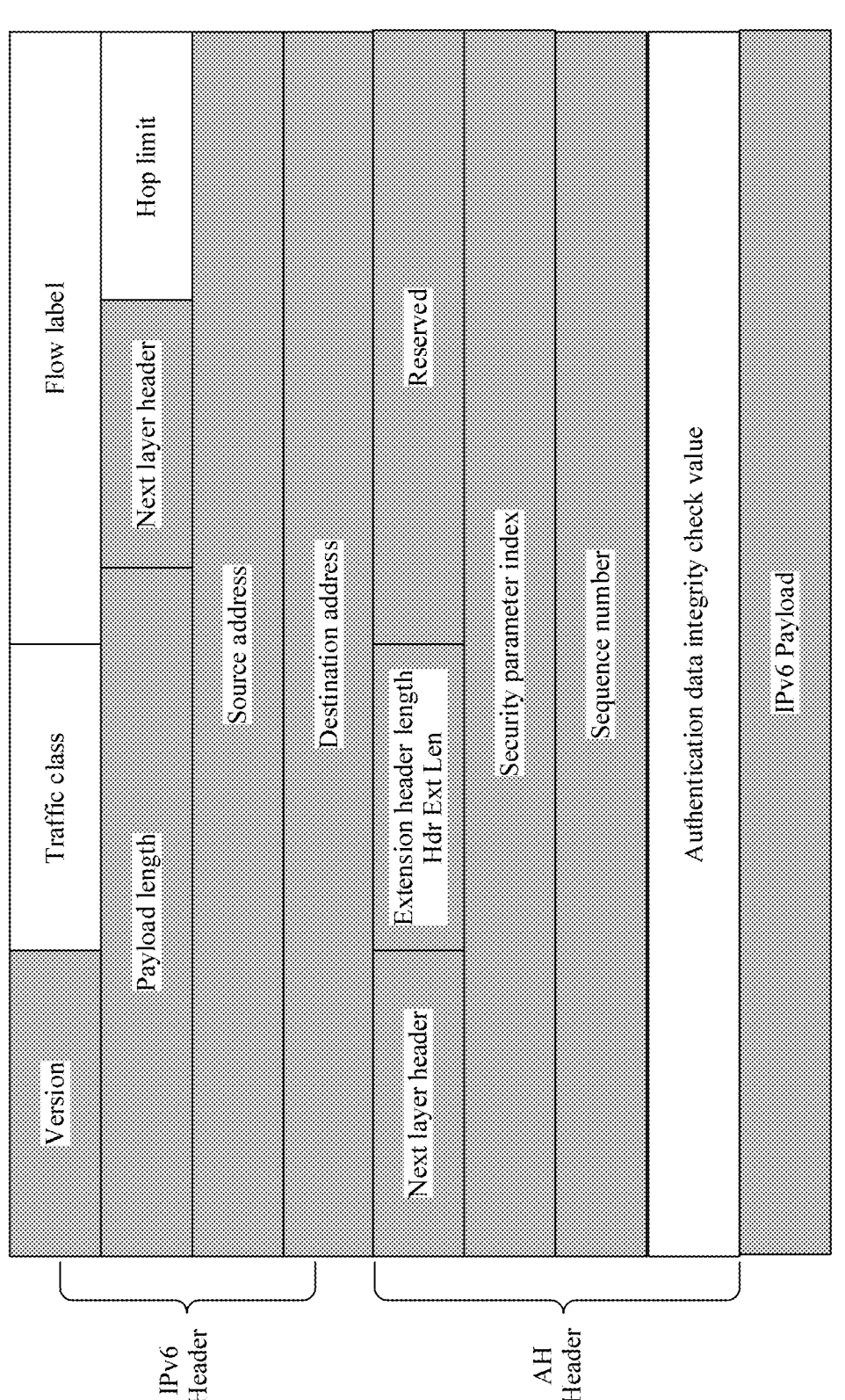
FIG. 3 is a schematic diagram of a structure of an IPsec packet according to an embodiment of this application.

FIG. 3 is a schematic diagram of a structure of an IPsec packet according to an embodiment of this application.

As shown in FIG. 3, the IPv6 packet includes an IPv6 header, an AH header, and an IPv6 payload.

The fields in the IPv6 header are not described in detail herein.

The AH header includes a Next Header field, a Hdr Ext Len field, a Reserve field, a Security Parameter Index field, a Sequence Number field, and an Authentication Data ICV field.

The Next Header field includes 8 bits, and is used to carry a type of a next packet header.

The Hdr Ext Len field includes 8 bits, and is used to carry a length of a packet.

The Reserve field includes 16 bits, and is a reserved field.

A security parameter index (SPI) field includes 32 bits, and is used to carry a security parameter index, where the security parameter index may be used to determine a key and an encryption algorithm. A node that generates the IPsec packet may perform key agreement with a node that performs AH verification. After the agreement is reached, a specific value of the security parameter index is determined, and the specific value is encapsulated into the IPsec packet and sent to the node that performs the AH verification. In a key agreement manner, the key is determined based on parameters generated by nodes participating in the agreement. For example, node A and node B perform key agreement, node A generates parameter $A_1$, and node B generates parameter $B_1$. By performing corresponding calculation on the parameter A1 and the parameter B1, the key used in the AH verification is obtained. Therefore, there is a low probability that the key is leaked, and security is high. In this way, different from HMAC verification, in this manner, an additional key protection solution is not required, where the additional key protection solution is used to protect security of a key used for the HMAC verification. Therefore, compared with the HMAC verification, performing AH verification by using an IPsec technology can reduce resource consumption of a node because no additional key protection solution is needed to protect security of a key.

The sequence number field may be used to carry a packet sequence number, and anti-replay attack may be implemented based on the packet sequence number.

The authentication data integrity check value (ICV) field is used to carry a verification value of the AH verification. A length of this field is not fixed, and is an integer multiple of 32 bits.

In a specific example, using AH verification to ensure security of packet transmission in an IPsec tunnel may be implemented in the following manner: An ingress node of the IPsec tunnel may encapsulate the AH header into the IPv6 packet, and a structure of an obtained packet is shown in FIG. 3. A value of the Authentication Data ICV field is obtained through ICV calculation on fields with shadow shown in FIG. 3. Correspondingly, when receiving the IPv6 packet shown in FIG. 3, the egress node of the IPsec tunnel may perform ICV calculation on the fields with shadow, and compare a calculated value with the value of the Authentication Data ICV field. If the two values are the same, it is determined that the packet is not tampered with, and the packet continues to be forwarded. If the two values are different, it is determined that the packet is tampered with, and the packet is discarded. In this manner, security of transmission of the IPv6 packet in the IPsec tunnel may be ensured.

The foregoing manner of AH verification is merely a specific example, and does not constitute a limitation on embodiments of this application.

Because the AH verification may ensure the security of transmission of the IPv6 packet in the IPsec tunnel, in some embodiments, the AH verification may also be applied to a transmission process of an SRv6 packet, to ensure security of transmission of the SRv6 packet in an IPsec tunnel.

Figure 4:
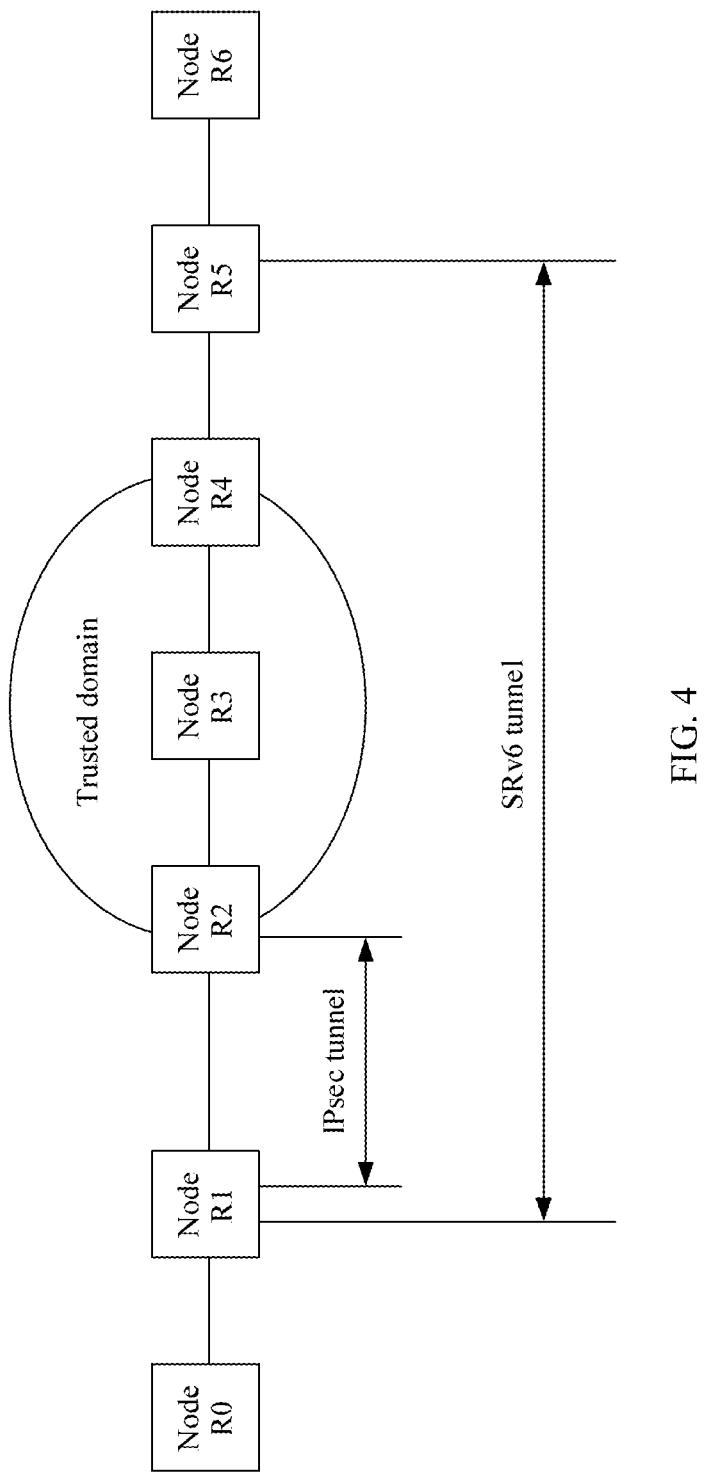
FIG. 4 is a schematic diagram of an example application scenario according to an embodiment of this application.

Refer to FIG. 4 for understanding. FIG. 4 is a schematic diagram of an example application scenario according to an embodiment of this application.

As shown in FIG. 4, a node R0 needs to forward a packet to a node R6 through a node R1, a node R2, a node R3, a node R4, and a node R5 in sequence. An SRv6 tunnel is deployed between the node R1 and the node R5. The node R2, the node R3, and the node R4 belong to an SRv6 trusted domain 100. After receiving an original packet from the node R0, the node R1 may encapsulate the original packet to obtain an SRv6 packet. To ensure security of the SRv6 packet forwarded to the trusted domain, an IPsec tunnel may be deployed between the node R1 and the node R2. In addition, security of transmission of the SRv6 packet in the IPsec tunnel may be ensured by using AH verification.

It should be noted that FIG. 4 is merely shown for ease of understanding, and does not constitute a limitation on embodiments of this application. For example, an ingress node of the IPsec tunnel may not necessarily be the same as an ingress node of the SRv6 tunnel shown in FIG. 4, and the ingress node of the IPsec tunnel may alternatively be a transit node of the SRv6 tunnel. For another example, an egress node of the IPsec tunnel may not necessarily be an edge node of the trusted domain shown in FIG. 4. The egress node of the IPsec tunnel may alternatively be a transit node of the trusted domain.

In the following embodiments, an example in which an egress node of an IPsec tunnel is an edge node of a trusted domain is used for description. However, this is merely for ease of describing an implementation of this embodiment of this application, and does not constitute a limitation on embodiments of this application.

When an SRv6 packet to which the AH verification is applied is transmitted in an IPsec tunnel, packet encapsulation formats of the SRv6 packet may include encapsulation in a tunnel mode and encapsulation in a transport mode. The following separately describes a structure of a packet encapsulated in a tunnel mode and a structure of a packet encapsulated in a transport mode.

FIG. 5 is a schematic diagram of a structure of an SRv6 packet encapsulated in a tunnel mode according to an embodiment of this application.

As shown in FIG. 5, the SRv6 packet includes a New IP Header, an AH Header, an IP header, an SRH, and a Payload.

The New IP Header is a newly added IP packet header, and the New IP Header may include an ingress node address of an IPsec tunnel and an egress node address of the IPsec tunnel, and is used to guide forwarding of the packet in the IPsec tunnel. For the AH Header, refer to the foregoing description part in FIG. 3. Details are not described herein again.

For the SRv6 packet shown in FIG. 5, a value of an Authentication Data ICV field in the AH Header is obtained through ICV calculation on fields in the New IP Header, the AH Header, the IP header, the SRH, and the Payload. In other words, both the SRH and the Payload participate in the ICV calculation. Therefore, if the SRv6 packet passes the AH verification, it indicates that neither the SRH nor the Payload of the SRv6 packet is tampered with, thereby ensuring security of transmission of the SRv6 packet in the IPsec tunnel.

It can be learned from the structure of the packet shown in FIG. 5 that the New IP Header may guide forwarding of the SRv6 packet in the IPsec tunnel. In addition, security of transmission of the SRv6 packet in the IPsec tunnel may be ensured by using AH verification. However, because the SRH is encapsulated into an inner layer, when the SRv6 packet is forwarded in the IPsec tunnel, a forwarding node does not parse the SRH. Consequently, the packet cannot be forwarded based on the SRH. In other words, when the SRv6 packet is forwarded in the IPsec tunnel, the SRH cannot be used to guide packet forwarding. The SRH can be used to guide forwarding of the packet only after the SRv6 packet leaves the IPsec tunnel and the New IP Header and the AH Header are removed. For an encapsulation format of a packet encapsulated in an IPsec transport mode, refer to related descriptions in RFC 4302. Details are not described herein. RFC 4302 is incorporated into this application by reference in its entirety.

However, in some scenarios, for example, as shown in FIG. 4, an IPsec tunnel is a part of an SRv6 tunnel, it is generally required that an SRH be used to guide forwarding of a packet when an SRv6 packet is forwarded in an IPsec tunnel. As a result, encapsulation in a transport mode is not applicable to some scenarios.

FIG. 6 is a schematic diagram of a structure of an SRv6 packet encapsulated in a transport mode according to an embodiment of this application.

As shown in FIG. 6, the SRv6 packet includes an IP header, an SRH, an AH Header, and a Payload. The SRH mentioned herein may also be referred to as an SRH. The AH Header mentioned herein may also be referred to as an AH.

It may be seen from FIG. 6 that, different from FIG. 5, in FIG. 6, the AH Header is encapsulated into an inner layer, and the SRH is encapsulated into an outer layer of the AH Header. The AH Header is encapsulated into an inner layer of the SRH. Therefore, the AH Header is processed only after the SRH is processed. In other words, for a transit node that performs forwarding by using SRv6, the transit node performs forwarding based on the SRH, but does not parse the AH Header. The AH Header is parsed only after a tail node, namely, the last node indicated by an SID list in the SRH, that performs forwarding by using the SRH removes the SRH. In some network scenarios, an IPsec tunnel is part of an SRv6 tunnel. In other words, an egress node of the IPsec tunnel is the transit node that performs forwarding by using SRv6. In this case, when the SRv6 packet is forwarded in the IPsec tunnel, the SRH may be used to guide packet forwarding, but AH verification cannot be used to ensure security of transmission of the packet. The egress node of the IPsec tunnel does not perform integrity verification on the SRH. Consequently, even if the SRH is tampered with or a network hacker maliciously inserts a new SRH, the packet is still forwarded in a network. In addition, a sequence number field in the AH is used to prevent a replay attack, but the egress node of the IPsec tunnel does not perform a step of the AH verification. Consequently, when the SRv6 packet is transmitted in the IPsec tunnel, the replay attack cannot be prevented.

To resolve the foregoing problems, embodiments of this application provide a method for verifying an SRv6 packet, where the SRv6 packet may be encapsulated in an IPsec transport mode, and at least one SRH of the SRv6 packet is verified by using AH verification. Compared with verifying an SRH by using HMAC verification, the method may reduce resource consumption caused by verifying the SRH, prevent a replay attack, support key agreement, and prevent a network hacker from performing a network attack in a manner of newly adding an SRH. Compared with verifying, by using AH verification, an SRv6 packet encapsulated in an IPsec tunnel mode, in the method, the at least one SRH of the SRv6 packet may be verified when the SRH is used to forward the SRv6 packet. Compared with a conventional method for verifying, by using AH verification, an SRv6 packet encapsulated in an IPsec transport mode, in the method, the SRH in the packet may be verified.

The following describes a packet forwarding method provided in embodiments of this application with reference to the application scenario shown in FIG. 4. FIG. 7 is a diagram of signaling exchange of a method for verifying an SRv6 packet according to an embodiment of this application. A method 100 for verifying an SRv6 packet shown in FIG. 7 may be implemented according to S101 to S104 below.

S101: A node R1 obtains a packet 1, where the packet 1 is an SRv6 packet. The packet 1 includes an AH and at least one SRH, the packet 1 carries indication information 1, and the indication information 1 indicates a node R2 to perform AH verification on the packet 1.

As shown in FIG. 4, the node R1 is an ingress node of the IPsec tunnel, and the node R2 is an egress node of the IPsec tunnel.

In this embodiment of this application, the packet 1 may be a packet that is obtained by the node R1 by encapsulating an obtained initial packet. In an example, the node R1 may receive a packet 2 from a node R0, and encapsulate the packet 2 to obtain the packet 1. For example, the node R1 receives an IPv4 packet or an IPv6 packet from the node R0, and then the node R1 re-encapsulates the packet, and adds an SRH and an AH to the packet, to obtain the packet 1.

In this embodiment of this application, the node R1 encapsulates the obtained initial packet by using a transport mode. For an encapsulation format of a packet encapsulated in an IPsec transport mode, refer to related descriptions in RFC 4302. Details are not described herein. In an example, a packet structure of the packet 1 may be a packet structure shown in FIG. 6.

In this embodiment of this application, when the node R1 re-encapsulates the received initial packet, the node R1 may add the indication information 1, to obtain the packet 1 including the indication information 1. The indication information 1 indicates the node R2 to perform AH verification on the packet 1. In addition, to avoid a network attack caused by an SRH that is tampered with or an SRH that is newly added to the packet by a network hacker, a range of the AH verification includes the at least one SRH. In this way, even if the AH Header is encapsulated into an inner layer of the SRH as shown in FIG. 6, and the egress node R2 of the IPsec tunnel is a transit node that performs forwarding by using SRv6, the node R2 may also perform the AH verification on the packet 1 based on the indication information 1, and the verification range includes the at least one SRH, to prevent a network hacker from performing a network attack by using an SRH. The using the SRH mentioned herein includes but is not limited to tampering with the SRH and/or inserting a new SRH.

In this application, the range of the AH verification may include one SRH, or may include a plurality of SRHs.

In this embodiment of this application, the indication information 1 may be carried in one field in the packet 1. This field is not specifically limited in this embodiment of this application. The field used to carry the indication information 1 may be but is not limited to the following several fields.

In an example, the field may be one field in the SRH. In other words, the indication information 1 may be carried in the SRH. For example, the indication information 1 may be carried in a reserved field or an extended TLV field of the SRH. Considering that a meaning of a flag field in the SRH is not clearly defined currently, a flag field may be considered as the reserved field of the SRH. Therefore, the flag field in the SRH may be used to carry the indication information 1.

In another example, in an actual application, after obtaining the packet 1, the node R1 modifies a destination address in an IPv6 header of the packet 1 to an address of the node R2, so as to send the packet 1 to the node R2. A node that receives the packet 1 determines whether the destination address is an address of the node. If yes, the node performs a next operation, for example, continues to parse the segment routing header SRH. If the destination address is not the address of the node, the node continues to forward the packet to a node corresponding to the destination address. That is, when receiving the packet 1, the node R2 definitely parses the destination address of the packet 1. Therefore, in embodiments of this application, the field used to carry the indication information 1 may be the destination address field. In other words, the indication information 1 may be carried in the destination address of the packet 1.

In an actual application, a destination address of the SRv6 packet includes 128 bits, and the 128 bits may include three fields: locator, function, and arguments. The locator field is used to carry a network segment address and a subnetwork address. Both the function and arguments fields are used to carry behavior corresponding to the locator. For example, when the destination address is a binding segment identifier (BSID), the behavior indicated by the function is expanding the BSID into a SID list. The BSID may be used to identify a forwarding path, and the forwarding path may be indicated by the SID list. Therefore, in an implementation of embodiments of this application, the function field or the arguments field of the destination address may be used to carry the indication information 1. For example, a function type (for example, END. AH mentioned below) may be newly added. The function type is used to carry the foregoing indication information 1, and indicates the node corresponding to the destination address to perform AH verification. For another example, when the function field has been used, the arguments field is used to carry the indication information 1. In another implementation, the node R2 may store a correspondence between the destination address of the packet 1 and the indication information 1, to achieve an objective of carrying the indication information 1 in the destination address of the packet 1.

Figure 8A:
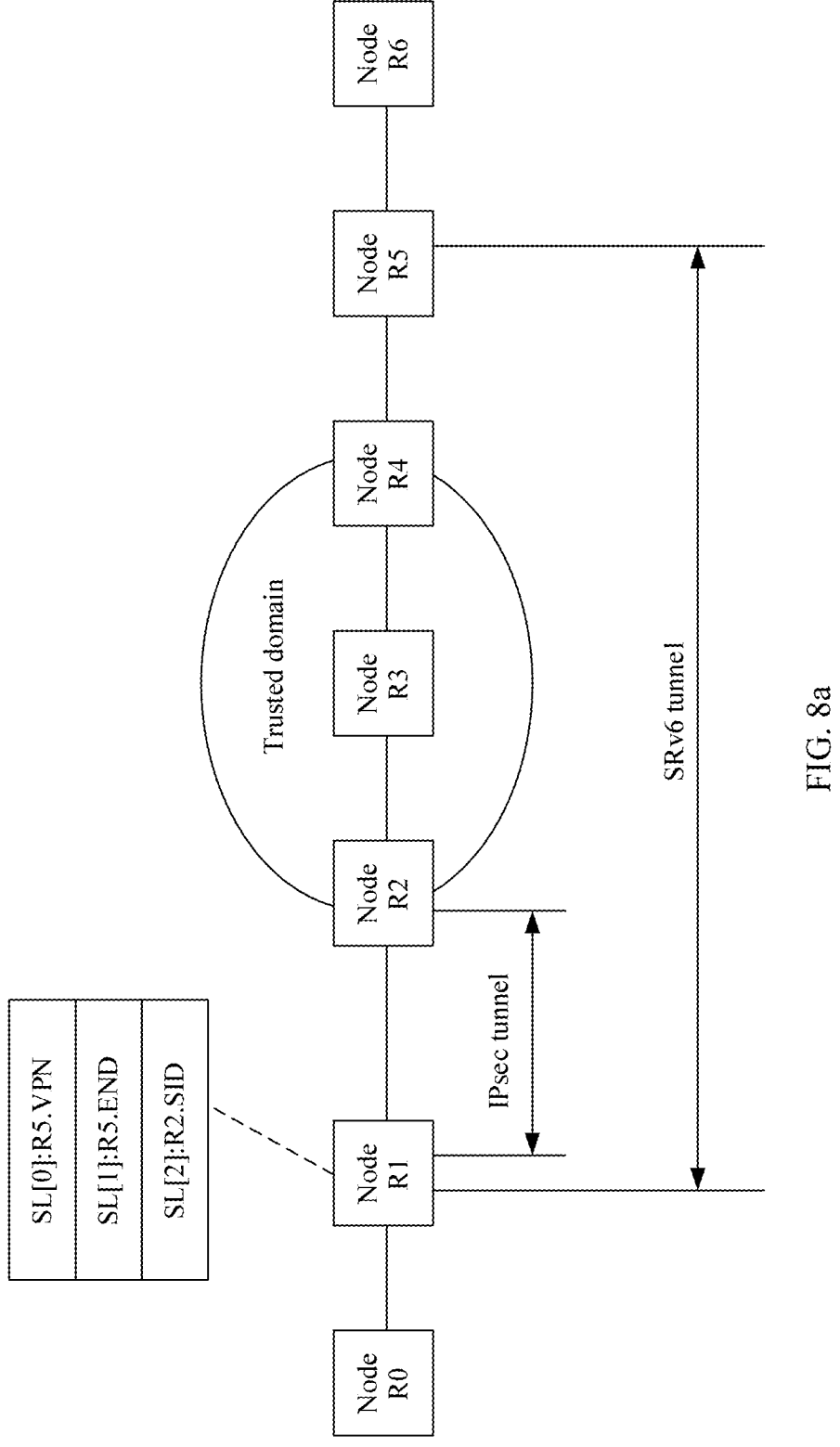
FIG. 8a is a schematic diagram of an SID list according to an embodiment of this application.
Figure 8B:
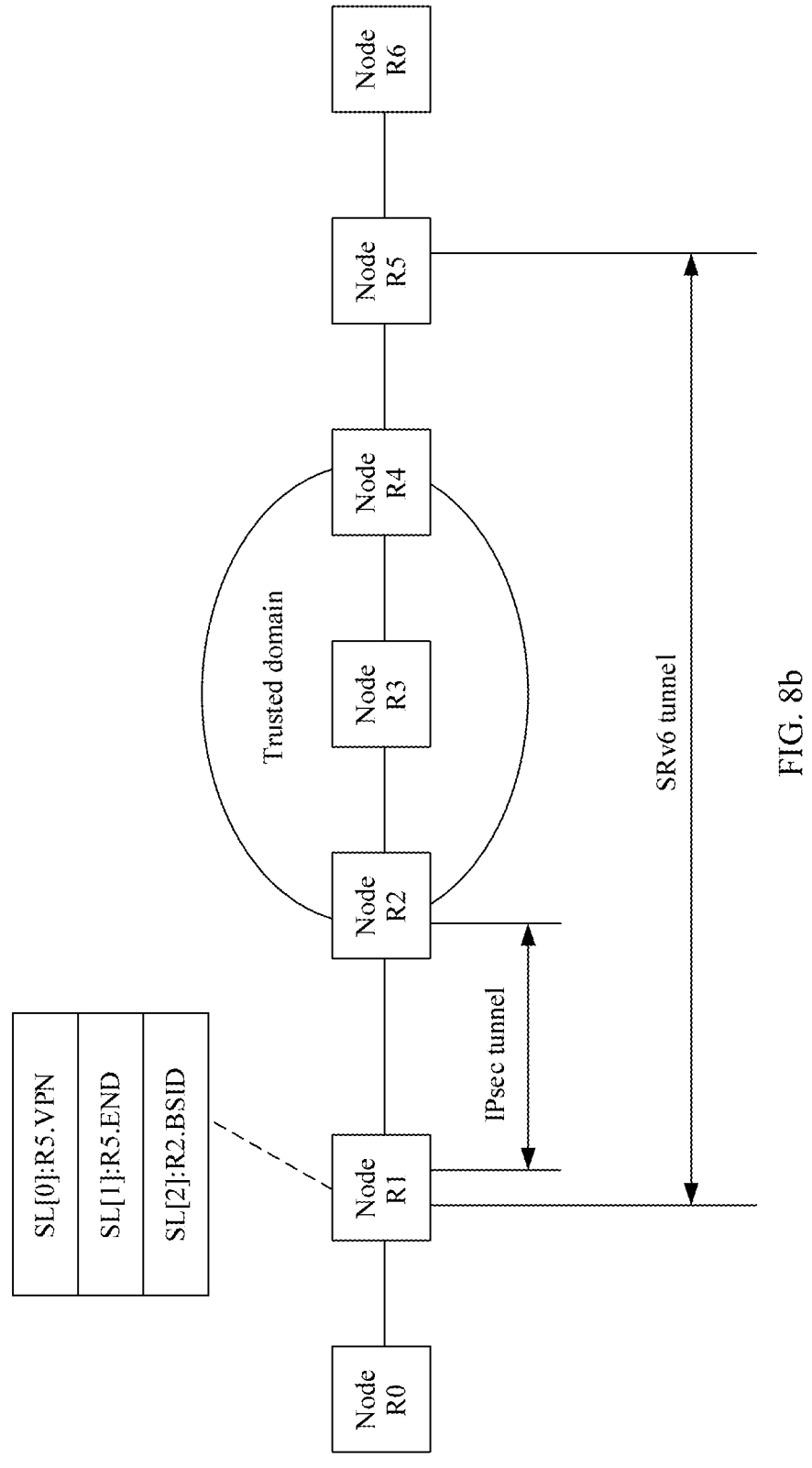
FIG. 8b is a schematic diagram of an SID list according to an embodiment of this application.
Figure 8C:
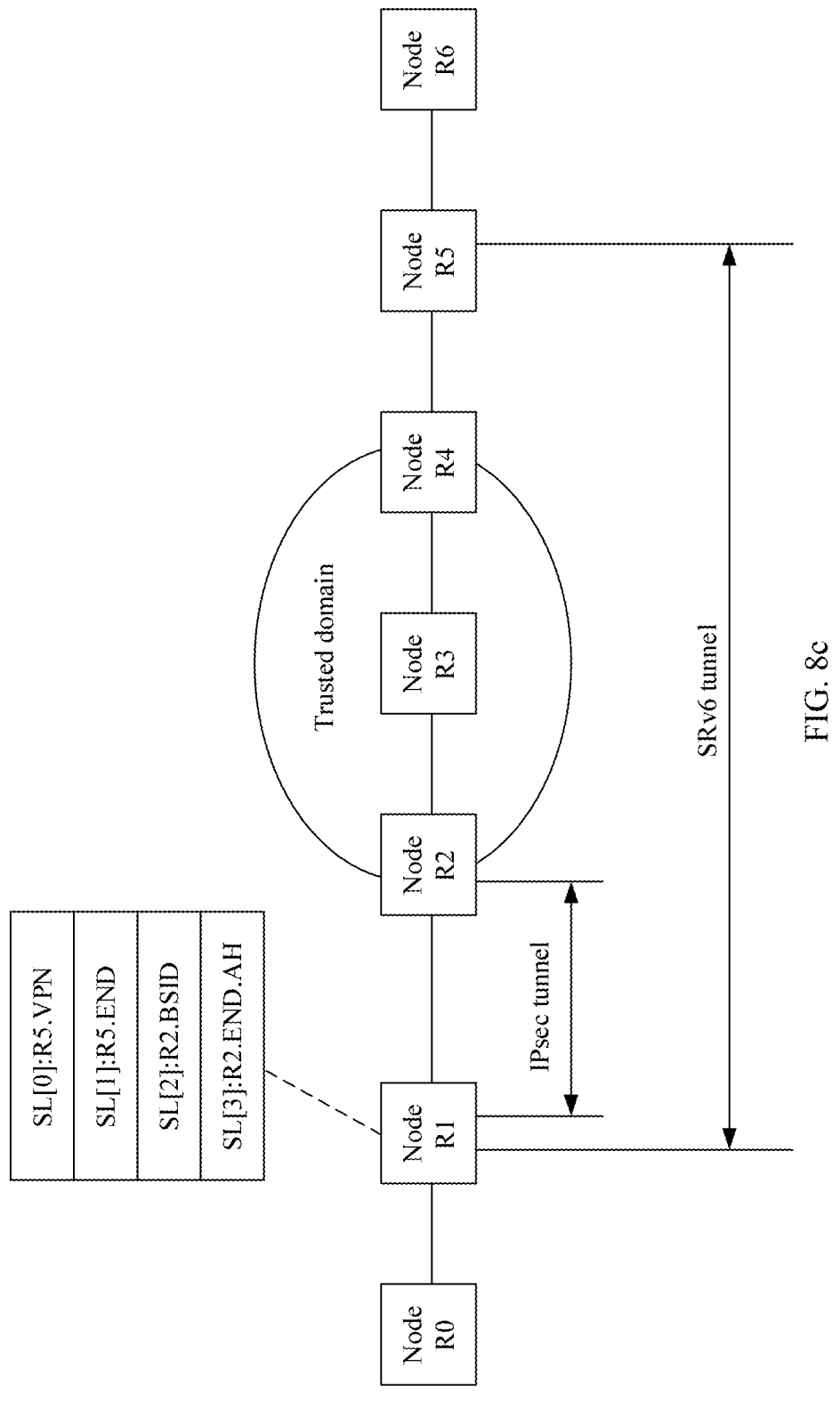
FIG. 8c is a schematic diagram of an SID list according to an embodiment of this application.
Figure 8D:
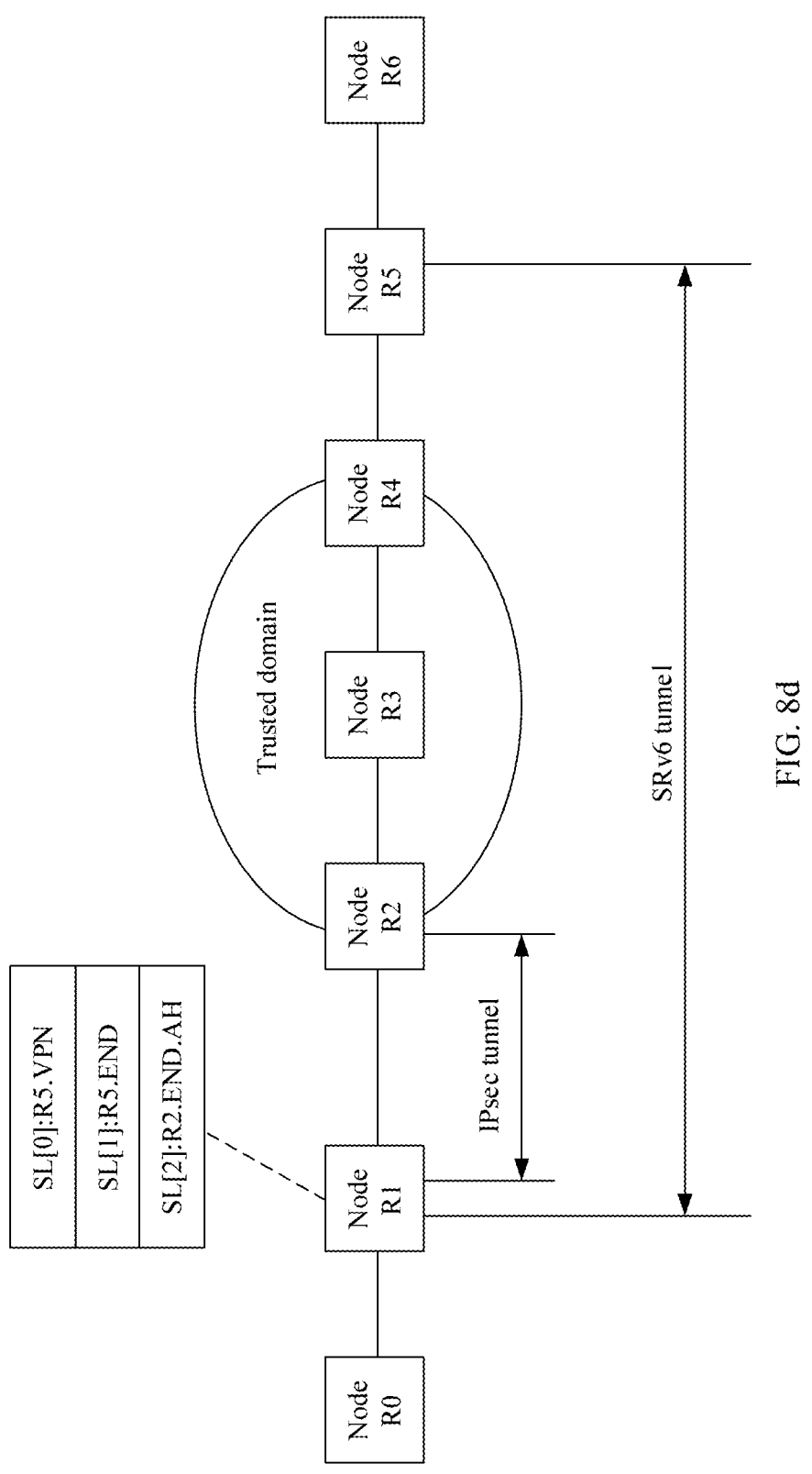
FIG. 8d is a schematic diagram of an SID list according to an embodiment of this application.

For the destination address of the packet 1, it should be noted that the node indicated by the destination address is the node R2. The destination address is not specifically limited in this embodiment of this application. In an example, the destination address may be R2.SID, in other words, the destination address may be a segment identifier of the node R2. In another example, the destination address may be R2. BSID, in other words, the destination address is a binding segment identifier of the node R2, and is used to identify a path starting from the node R2. When the destination address of the packet 1 is the R2.SID, an SID list of the packet 1 is shown in FIG. 8a. When the destination address of the packet 1 is the R2. BSID, an SID list of the packet 1 is shown in FIG. 8b. For R5.VPN and R5.END shown in FIG. 8a and FIG. 8b, it should be noted that the R5.END indicates an R5 node, and indicates a node R4 to forward the packet 1 to the node R5; and the R5.VPN is used to correspond to a specific virtual private network (VPN) instance deployed on the node R5. In still another example, the destination address may be associated with the IPsec tunnel. For example, the destination address of the packet 1 may be an egress IP address R2. END. AH of the IPsec tunnel. In this case, the egress IP address may be associated with the node R2 in advance, and a route is advertised to the node R1, so that the packet 1 can be forwarded to the node R2 when the destination address of the packet 1 is the egress IP address of the IPsec tunnel. When the destination address of the packet 1 is the egress IP address of the IPsec tunnel, an SID list of the packet 1 may be shown in FIG. 8c. The R2. BSID indicates a forwarding path, and indicates the node R2 to forward the received packet 1. Certainly, if a trusted domain is accessed without using the BSID, an SID list of the packet 1 may be shown in FIG. 8d.

In this embodiment of this application, if the destination address of the packet 1 is R2. BSID, the BSID may be generated by the node R2 or a control management device. In this case, a node outside the trusted domain sets a destination address of an SRv6 packet forwarded to the trusted domain to the BSID, to prevent network topology leakage in the trusted domain.

In some embodiments, the IPsec tunnel may be associated with a VPN instance. Generally, one IPsec tunnel may be associated with one or more VPN instances. That is, the IPsec tunnel is used to transmit a packet corresponding to the VPN instance associated with the IPsec tunnel. In addition, the BSID may also be associated with the IPsec tunnel. One BSID may correspond to one IPsec tunnel.

In this embodiment of this application, if the destination address of the packet 1 is the egress IP address of the IPsec tunnel or the R2.SID, the IPsec tunnel may be associated with a plurality of VPN instances, to transmit packets corresponding to the plurality of VPN instances. If the destination address of the packet 1 is the R2. BSID, the IPsec tunnel may be associated with one VPN instance, where the VPN instance is a VPN instance associated with the R2. BSID.

It can be learned from the foregoing description part of FIG. 3 that, currently, a verification range of AH verification does not include an SRH. By contrast, to avoid a network attack caused by an SRH that is tampered with, the range of the AH verification includes the at least one SRH in this application. Specifically, in an implementation, in addition to indicating the egress node of the IPsec tunnel to perform the AH verification, the indication information 1 may further indicate that the verification range of the AH verification includes the at least one SRH. In another implementation, when the node R1 re-encapsulates the received initial packet, in addition to adding the indication information 1, the node R1 may further add indication information 2, to obtain a packet 1 including the indication information 1 and the indication information 2. The indication information 2 indicates that the verification range of the AH verification includes the at least one SRH. In this case, the indication information 1 indicates the egress node of the IPsec tunnel to perform the AH verification, and the indication information 2 indicates that the verification range of the AH verification includes the at least one SRH.

In this embodiment of this application, the indication information 2 may be carried in one field in the packet 1. This field is not specifically limited in embodiments of this application. The following describes several possible fields used to carry the indication information 2.

Considering that the AH verification needs to be performed based on related content in the AH, in an implementation, the indication information 2 may be carried in the AH. For example, the indication information 2 may be carried in a reserved field of the AH. For example, one bit of a Reserve field in the AH may be used to carry the indication information 2. Certainly, the indication information 2 may be carried in another field of the packet 1, for example, be carried in the reserved field or the extended TLV field of the SRH.

It may be understood that the node R2 may perform the AH verification on the received packet 1 based on the indication information 1, the indication information 2, and the AH, and the verification range of the AH verification includes the SRH.

In an implementation of this embodiment of this application, the verification range of the AH verification performed on the packet 1 may further include a payload of the packet 1. When the verification range of the AH verification includes the payload, compared with a solution of using HMAC verification, a solution provided in this embodiment of this application may prevent a network hacker from performing a network attack by using the payload. The performing the network attack by using the payload mentioned herein may include, for example, tampering with the payload. In this way, an attack packet may be transmitted in a network, which not only consumes network resources, but also has security risks.

In an implementation of this embodiment of this application, considering that SRv6 packet processing further includes an IP packet header in addition to the SRH and the payload, the IP packet header also carries some important information, for example, a final destination address of the packet (for example, a destination address after the packet leaves the SRv6 tunnel). If the IP packet header is tampered with, security risks exist. Therefore, in some embodiments, the verification range of the AH verification performed on the packet 1 may further include an IP packet header of the packet 1.

Certainly, the verification range of the AH verification performed on the packet 1 may include both the IP packet header of the packet 1 and the payload of the packet 1, to implement integrity verification on the packet 1. The IP packet header mentioned herein may be, for example, the foregoing IPv6 header.

As shown in FIG. 3, the AH includes an Authentication Data ICV field, and a value of the field may be obtained by the node R1 through ICV calculation on a specific field in the packet 1. A field used in the ICV calculation is related to the verification range of the AH verification. If the verification range of the AH verification includes the SRH, a field used in the ICV calculation may be a field in the SRH. If the verification range of the AH verification includes the SRH and the payload, fields used in the ICV calculation may be the SRH and the payload. If the verification range of the AH verification includes the SRH and the IP packet header, fields used in the ICV calculation may be the SRH and the IP packet header. If the verification range of the AH verification includes the SRH, the IP packet header, and the payload, fields used in the ICV calculation may be the SRH, the IP packet header, and the payload. In an implementation of this embodiment of this application, if the packet 1 includes the indication information 2, a value of the indication information 2 may indicate the range of the AH verification. For example, when the value of the indication information 2 is A, the range of the AH verification includes the SRH and the payload; when the value of the indication information 2 is B, the range of the AH verification includes the SRH and the IP header; or when the value of the indication information 2 is C, the range of the AH verification includes the SRH, the payload, and the IP header.

When performing AH verification on the received packet 1, the node R2 also performs ICV calculation on the specific field in the packet 1, and compares an obtained value through calculation with the value carried in the Authentication Data ICV field of the packet 1, to determine whether the packet 1 is tampered with. In an actual application, in a forwarding process of the packet 1, values of some fields are immutable, while values of some fields are mutable. The fields whose values are mutable may be further classified into two types: a mutable but predictable type and a mutable but unpredictable type. The mutable but unpredictable type may be referred to as a mutable type for short. The mutable but predictable type means that a value of a field may be predetermined when the node R2 receives the packet 1. The mutable type means that a value of a field cannot be predetermined when the node R2 receives the packet 1.

To enable a result of the AH verification to correctly indicate whether the packet 1 is tampered with, in this embodiment of this application, when calculating the value of the Authentication Data ICV field, the node R1 may use the value of the mutable field as a preset value, for example, 0, and determine the value of the mutable but predictable field as a predicted value of the field, to perform ICV calculation. The predicted value mentioned herein refers to a value of the field when the node R2 receives the packet 1.

Types of fields in the SRv6 packet may be shown in the following Table 1.

TABLE 1

|  | Immutable field | Mutable field | Mutable but predictable field |
|---|---|---|---|
| IPv6 header | Version, Payload Length, Next Header, and Source Address | Traffic Class, Flow Label, and Hop Limit | Destination Address |
| SRH | Next Header, Hdr Ext Len, Routing Type, Last Entry, Flag, and Segment List | Tag | Segment Left |
| AH | Next Header, Hdr Ext Len, Reserve, Flag, Security Parameter Index, and Sequence Number | Authentication Data ICV | None |

A specific meaning of each field shown in Table 1 is not specifically described herein.

In addition, an IPv6 payload of an SRv6 packet is an immutable field.

It should be noted that, when the node R1 calculates the value of the Authentication Data ICV field, a value of the Destination Address field of the IPv6 header is an egress address of the IPsec tunnel, and the egress address of the IPsec tunnel may be the R2. SID, the R2. BSID, or the R2. AH. SID mentioned above. A value of the Segment Left is a corresponding value when the node R2 receives the packet 1. In this embodiment of this application, if the destination address carries the indication information 1, when receiving the packet 1, the node R2 may parse the destination address field, obtain the indication information 1, and perform the AH verification based on the indication information 1. If the destination address is the R2. SID, the indication information 1 may be carried in a function field of the R2. SID; if the destination address is the R2. BSID, the indication information 1 may be carried in an arguments field of the R2. BSID; and if the destination address is the R2. AH. SID, the indication information 1 may be carried in a function field or an arguments field of the R2. AH. SID.

S102: The node R1 sends the packet 1 to the node R2.

S103: The node R2 receives the packet 1.

The node R1 may forward the packet 1 to the node R2 after obtaining the packet 1. The node R2 may receive the packet 1 sent by the node R1. As shown in FIG. 4, the node R2 is an edge node of the trusted domain.

S104: The node R2 performs the AH verification on the packet 1 based on the indication information 1 and the AH, where the verification range of the AH verification includes the at least one SRH.

After receiving the packet 1, the node R2 first determines that the destination address of the packet 1 is the address of the node R2. Then, the node R2 obtains the indication information 1. The node R2 may perform a step of the AH verification on the packet 1 based on the indication information 1. Specifically, the node R2 may parse the AH, and determine, based on the Security Parameter Index field in the AH, an ICV algorithm and a key that are used in the AH verification. In addition, if the indication information 1 may indicate, in addition to indicating the egress node of the IPsec tunnel to perform the AH verification, that the verification range of the AH verification includes the at least one SRH, the node R2 may perform the AH verification on the packet 1 based on the indication information 1, and the verification range of the AH verification includes the at least one SRH. If the indication information 1 indicates the egress node of the IPsec tunnel to perform the AH verification, and the indication information 2 indicates that the verification range of the AH verification includes the at least one SRH, the node R2 may further determine, based on the indication information 2, that the verification range of the AH verification includes the SRH. For the indication information 1 and the indication information 2, refer to the description part of the indication information 1 and the indication information 2 in S101. Details are not described herein again.

In a specific example, that the node R2 performs the AH verification on the packet 1 may be implemented in the following manner: The node R2 may perform ICV calculation on the specific field in the packet 1. For the mutable field of the specific field, the value of the mutable field may be used as the preset value, for example, 0, for calculation. The specific field mentioned herein may include the SRH, may include the SRH and the payload, or may include the SRH, the IP packet header, and the payload. After performing ICV calculation on the specific field in the packet 1, the node R2 may compare the obtained value through calculation with the value carried in the Authentication Data ICV field in the packet 1. If the two values are the same, it indicates that the packet 1 is not tampered with. Further, the node R2 removes the AH, and forwards the packet based on the SRH. If the two values are different, it indicates that the packet 1 is tampered with. In this case, to avoid an attack on the network such as the trusted domain, the node R2 may discard the packet 1.

A specific implementation in which the node R2 forwards the packet based on the SRH may be, for example, determining, based on the SRH and a value of a segment left (SL) field, a next-hop destination node for packet forwarding. Details are not described herein.

In this embodiment of this application, the range of the AH verification includes the at least one SRH. In an embodiment, the node R2 may verify all SRHs in the packet 1. In this way, if an SRH newly added by a network hacker exists in the SRHs that are used in the verification, the AH verification fails, and it may be determined that the packet 1 is a packet that is tampered with. It can be learned that by using this solution, a network hacker may be prevented from performing a network attack by newly adding an SRH.

It can be learned from the foregoing description part of FIG. 3 that the AH includes an SPI field. Therefore, compared with HMAC verification, AH verification has an advantage of supporting key agreement. Because the AH verification supports key agreement, security of an AH key is higher, and no additional key protection solution is needed to protect the security of the AH key, thereby reducing resource consumption of the node R2. In addition, the AH includes the sequence number field, and the sequence number field may prevent a network hacker from repeatedly sending a same packet. In other words, compared with a solution using the HMAC verification, the solution in this embodiment of this application further supports anti-replay attack by preventing the same packet from being transmitted in the network and from occupying a network resource.

It can be learned from the foregoing descriptions that according to the solution in this embodiment of this application, whether the packet 1 is tampered with during transmission in the IPsec tunnel may be verified by using the AH verification, and the packet 1 continues to be forwarded only when the packet 1 passes the verification; otherwise, the packet 1 is discarded. In a scenario in which the node R2 is the edge node of the trusted domain, this method may ensure the security of the SRv6 packet forwarded to the trusted domain, thereby effectively preventing the trusted domain from being attacked. In a scenario in which the node R2 is not the edge node of the trusted domain, the solution in this embodiment of this application may also prevent a tampered SRv6 packet from continuing to be transmitted in the network, prevent the tampered packet from occupying the network resource, and eliminate a security risk caused by continuing to transmit the tampered SRv6 packet in the network.

It should be noted that the IPsec tunnel in this embodiment of this application may be established, for example, between nodes that have a high requirement for security protection. For example, as shown in FIG. 4, to prevent the trusted domain from being attacked, validity of an SRv6 packet from outside the trusted domain needs to be ensured. Therefore, an IPsec tunnel is deployed between the edge node R2 in the trusted domain and the node R1 outside the trusted domain. Alternatively, the IPsec tunnel may be established between nodes without another security protection measure. Certainly, only two scenarios in which an IPsec tunnel may be established are pointed out herein, and do not constitute a limitation on embodiments of this application.

An embodiment of this application further provides a method 200 for verifying an SRv6 packet. FIG. 9 is a schematic flowchart of a method for verifying an SRv6 packet according to an embodiment of this application. The following describes the method with reference to FIG. 9. The method shown in FIG. 9 may be implemented, for example, by performing steps S201 and S202.

S201: An egress node of an IPsec tunnel receives an SRv6 packet, where the SRv6 packet is a packet encapsulated in an IPsec transport mode, the SRv6 packet includes an AH and at least one SRH, the SRv6 packet carries first indication information, and the first indication information indicates the egress node to perform AH verification on the SRv6 packet.

S202: The egress node performs the AH verification on the SRv6 packet based on the first indication information and the A, where a verification range of the AH verification includes the at least one SRH.

The method 200 may be applied to implement S103 and S104 that are performed by the node R2 in the method 100 mentioned in the foregoing embodiments. When the method 200 is applied to implement S103 and S104 that are performed by the node R2 in the method 100 mentioned in the foregoing embodiments, the egress node of the IPsec tunnel corresponds to the node R2 in the method 100, the SRv6 packet corresponds to the packet 1 in the method 100, and the first indication information corresponds to the indication information 1 in the method 100.

In an implementation, the SRH carries the first indication information.

In an implementation, a reserved field or an extended TLV field of the SRH is used to carry the first indication information.

In an implementation, the reserved field is a flag field.

In an implementation, a destination address of the SRv6 packet carries the first indication information.

In an implementation, an arguments field or a function field of the destination address carries the first indication information.

In an implementation, the egress node stores a correspondence between the destination address and the first indication information.

In an implementation, the destination address of the SRv6 packet is a first segment identifier SID, and the first SID is an SID or a BSID of the egress node. The SID of the egress node may correspond to the R2. SID in the method 100, and the BSID of the egress node may correspond to the R2. BSID in the method 100.

In an implementation, the destination address of the SRv6 packet is a second SID, and the second SID is associated with the IPsec tunnel.

In an implementation, the second SID is an egress IP address of the IPsec tunnel. The egress IP address of the IPsec tunnel may correspond to the R2.AH.SID in the method 100.

In an implementation, the SRv6 packet includes second indication information, and the second indication information indicates that the verification range of the AH verification includes the SRH. The second indication information may correspond to the indication information 2 in the method 100.

In an implementation, the AH includes the second indication information.

In an implementation, a reserved field of the AH carries the second indication information.

In an implementation, that the egress node performs the AH verification on the SRv6 packet based on the first indication information and the AH includes: the egress node performs the AH verification on the SRv6 packet based on the first indication information, the second indication information, and the AH.

In an implementation, the verification range of the AH verification further includes a payload of the SRv6 packet.

In an implementation, the verification range of the AH verification further includes an IPv6 packet header of the SRv6 packet.

In an implementation, the egress node of the IPsec tunnel is an ingress node of an SRv6 trusted domain.

In an implementation, the SRv6 packet includes a plurality of SRHs, and the range of the AH verification includes the plurality of SRHs.

In an implementation, the method further includes:

the egress node forwards the SRv6 packet that passes the AH verification; or the egress node discards the SRv6 packet that fails the AH verification.

For specific implementation of the method 200, refer to the foregoing description parts of S103 and S104 in the method 100. Details are not described herein again.

An embodiment of this application further provides a method 300 for verifying an SRv6 packet. FIG. 10 is a schematic flowchart of a method for verifying an SRv6 packet according to an embodiment of this application. The following describes the method with reference to FIG. 10. The method shown in FIG. 10 may be implemented, for example, by performing steps S301 and S302.

S301: An ingress node of an IPsec tunnel obtains an SRv6 packet, where the SRv6 packet is a packet encapsulated in an IPsec transport mode, the SRv6 packet includes an AH and at least one SRH, the SRv6 packet carries first indication information, the first indication information indicates an egress node of the IPsec tunnel to perform AH verification on the SRv6 packet, and a verification range of the AH verification includes the at least one SRH.

S302: The ingress node sends the SRv6 packet to the egress node.

The method 300 may be applied to implement S101 and S102 that are performed by the node R1 in the method 100 mentioned in the foregoing embodiments. When the method 300 is applied to implement S101 and S102 that are performed by the node R1 in the method 100 mentioned in the foregoing embodiments, the ingress node of the IPsec tunnel corresponds to the node R1 in the method 100, the egress node of the IPsec tunnel corresponds to the node R2 in the method 100, the SRv6 packet corresponds to the packet 1 in the method 100, and the first indication information corresponds to the indication information 1 in the method 100.

In an implementation, the SRH carries the first indication information.

In an implementation, a reserved field or an extended TLV field of the SRH is used to carry the first indication information.

In an implementation, the reserved field is a flag field.

In an implementation, a destination address of the SRv6 packet carries the first indication information.

In an implementation, an arguments field or a function field of the destination address carries the first indication information.

In an implementation, the egress node stores a correspondence between the destination address of the SRv6 packet and the first indication information.

In an implementation, the destination address of the SRv6 packet is a first segment identifier SID, and the first SID is an SID or a BSID of the egress node. The SID of the egress node may correspond to the R2. SID in the method 100, and the BSID of the egress node may correspond to the R2. BSID in the method 100.

In an implementation, the destination address of the SRv6 packet is a second SID, and the second SID is associated with the IPsec tunnel.

In an implementation, the second SID is an egress IP address of the IPsec tunnel. The egress IP address of the IPsec tunnel may correspond to the R2.AH.SID in the method 100.

In an implementation, the SRv6 packet includes second indication information, and the second indication information indicates that the verification range of the AH verification includes the SRH. The second indication information may correspond to the indication information 2 in the method 100.

In an implementation, the AH includes the second indication information.

In an implementation, a reserved field of the AH carries the second indication information.

In an implementation, the verification range of the AH verification further includes a payload of the SRv6 packet.

In an implementation, the verification range of the AH verification further includes an IP packet header of the SRv6 packet.

In an implementation, the egress node of the IPsec tunnel is an ingress node of an SRv6 trusted domain.

In an implementation, the SRv6 packet includes a plurality of SRHs, and the range of the AH verification includes the plurality of SRHs.

For specific implementation of the method 300, refer to the foregoing description parts of S101 and S102 in the method 100. Details are not described herein again.

In addition, as shown in FIG. 11, an embodiment of this application further provides a network apparatus 1100, used in an egress node of an IPsec tunnel. FIG. 11 is a schematic diagram of a structure of a network apparatus according to this embodiment of this application. The network apparatus 1100 includes a transceiver unit 1101 and a processing unit 1102. The transceiver unit 1101 is configured to perform receiving and sending operations performed by the egress node of the IPsec tunnel in the foregoing embodiments. The processing unit 1102 is configured to perform operations other than the receiving and sending operations performed by the egress node of the IPsec tunnel mentioned in the foregoing embodiments. For example, the transceiver unit 1101 is configured to receive an SRv6 packet. The processing unit 1102 is configured to perform AH verification on the SRv6 packet based on first indication information and an AH that are carried in the SRv6 packet.

In addition, as shown in FIG. 12, an embodiment of this application further provides a network apparatus 1200, used in an ingress node of an IPsec tunnel. FIG. 12 is a schematic diagram of a structure of a network apparatus 1200 according to this embodiment of this application. The network apparatus 1200 includes a transceiver unit 1201 and a processing unit 1202. The transceiver unit 1201 is configured to perform receiving and sending operations performed by the ingress node of the IPsec tunnel in the foregoing embodiments. The processing unit 1202 is configured to perform operations other than the receiving and sending operations performed by the ingress node of the IPsec tunnel mentioned in the foregoing embodiments. For example, the processing unit 1202 is configured to obtain an SRv6 packet. The transceiver unit 1201 is configured to send the SRv6 packet to the egress node of the IPsec tunnel.

In addition, an embodiment of this application further provides a network apparatus 1300, used as an egress node of an IPsec tunnel. FIG. 13 is a schematic diagram of a structure of a network apparatus according to this embodiment of this application. The network apparatus 1300 includes a communication interface 1301 and a processor 1302 connected to the communication interface 1301. The communication interface 1301 is configured to perform receiving and sending operations performed by the egress node of the IPsec tunnel in the foregoing embodiments. The processor 1302 is configured to perform operations other than the receiving and sending operations performed by the egress node of the IPsec tunnel in the foregoing embodiments. For example, the communication interface 1301 is configured to perform a step of receiving an SRv6. The processor 1302 is configured to perform, based on first indication information and an AH that are carried in the SRv6 packet, a step of performing AH verification on the SRv6 packet.

Figure 14:
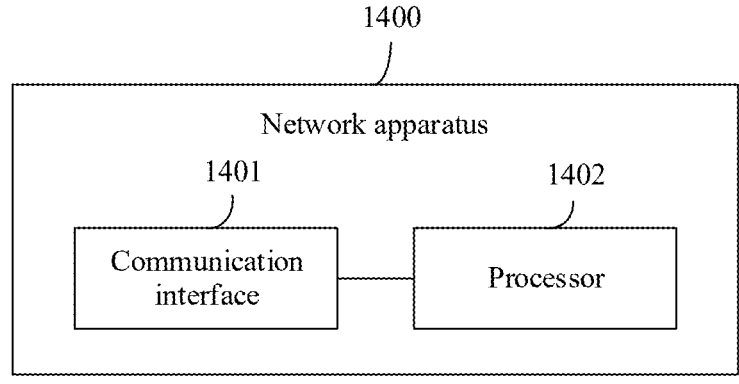
FIG. 14 is a schematic diagram of a structure of a network apparatus according to an embodiment of this application.

In addition, an embodiment of this application further provides a network apparatus 1400, used as an ingress node of an IPsec tunnel. FIG. 14 is a schematic diagram of a structure of a network apparatus according to this embodiment of this application. The network apparatus 1400 includes a communication interface 1401 and a processor 1402 connected to the communication interface 1401. The communication interface 1401 is configured to perform receiving and sending operations performed by the ingress node of the IPsec tunnel in the foregoing embodiments. The processor 1402 is configured to perform operations other than the receiving and sending operations performed by the ingress node of the IPsec tunnel in the foregoing embodiments. For example, the processor 1402 is configured to obtain an SRv6 packet. The communication interface 1401 is configured to send the SRv6 packet to the egress node of the IPsec tunnel.

Figure 15:
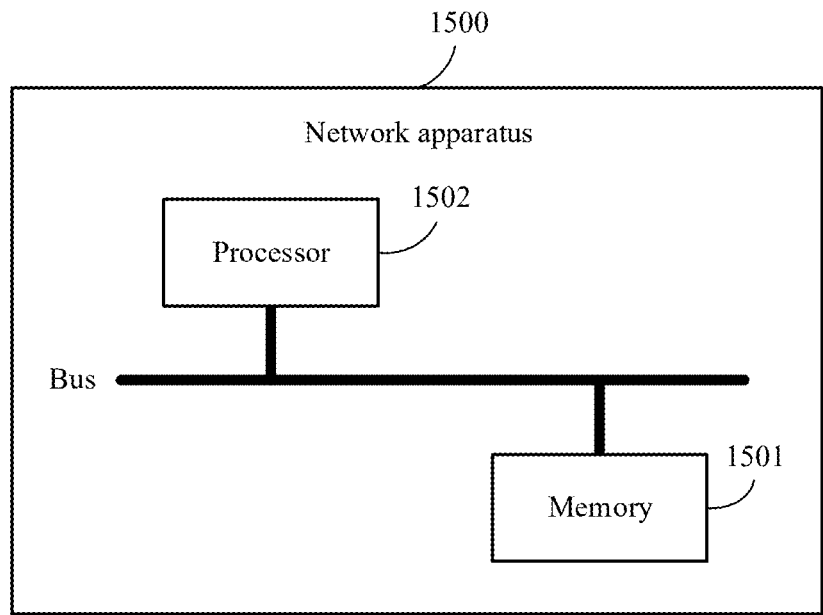
FIG. 15 is a schematic diagram of a structure of a network apparatus according to an embodiment of this application.

In addition, an embodiment of this application further provides a network apparatus 1500, used as an egress node of an IPsec tunnel. FIG. 15 is a schematic diagram of a structure of a network apparatus according to this embodiment of this application. The network apparatus 1500 includes a memory 1501 and a processor 1502. The memory 1501 is configured to store program code. The processor 1502 is configured to execute instructions in the program code, to enable the egress node of the IPsec tunnel to perform the steps performed by the egress node of the IPsec tunnel in the foregoing embodiments.

Figure 16:
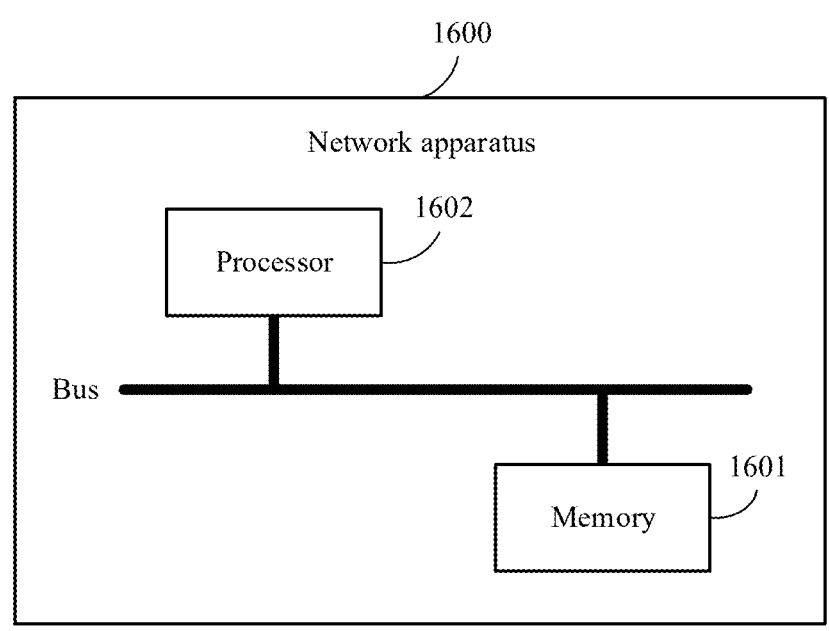
FIG. 16 is a schematic diagram of a structure of a network apparatus according to an embodiment of this application.

In addition, an embodiment of this application further provides a network apparatus 1600, used in an ingress node of an IPsec tunnel. FIG. 16 is a schematic diagram of a structure of a network apparatus according to this embodiment of this application. The network apparatus 1600 includes a memory 1601 and a processor 1602. The memory 1601 is configured to store program code. The processor 1602 is configured to execute instructions in the program code, to enable the ingress node of the IPsec tunnel to perform the steps performed by the ingress node of the IPsec tunnel in the foregoing embodiments.

An embodiment of this application further provides a computer-readable storage medium. The computer-readable storage medium stores instructions. When the instructions are executed on a computer, the computer is enabled to perform the steps performed by the egress node of the IPsec tunnel in the foregoing embodiments.

An embodiment of this application further provides a computer-readable storage medium. The computer-readable storage medium stores instructions. When the instructions are executed on a computer, the computer is enabled to perform the steps performed by the ingress node of the IPsec tunnel in the foregoing embodiments.

An embodiment of this application further provides a computer program product. The computer program product includes a computer program. When the computer program is executed on a computer, the computer is enabled to perform the steps performed by the ingress node of the IPsec tunnel or the egress node of the IPsec tunnel in the foregoing embodiments.

The processor mentioned in this application may be a central processing unit (CPU), a network processor (NP), or a combination of a CPU and an NP. Alternatively, the processor may be an application-specific integrated circuit (ASIC), a programmable logic device (PLD), or a combination thereof. The PLD may be a complex programmable logic device (CPLD), a field programmable gate array (FPGA), generic array logic (GAL), or any combination thereof. The processor may be one processor, or may include a plurality of processors.

The memory mentioned in this application may include a volatile memory, for example, a random-access memory (RAM). Alternatively, the memory may include a non-volatile memory, for example, a read-only memory (ROM), a flash memory, a hard disk drive (HDD), or a solid-state drive (SSD). The memory may further include a combination of the foregoing types of memories. The memory may be one memory, or may include a plurality of memories.

In a specific implementation, the memory mentioned in this application stores computer-readable instructions, and the computer-readable instructions include a plurality of software modules, for example, a transceiver module and a processing module. After executing each software module, the processor may perform a corresponding operation based on an indication of each software module. In this embodiment, an operation performed by a software module is actually an operation performed by the processor based on an indication of the software module. For example, in the method 200 described in embodiments of this application, the transceiver module may be configured to implement a related receiving or sending operation in the method 200. For example, the transceiver module is configured to perform the operation of receiving an SRv6 packet in S201. The processing module is configured to perform a processing operation other than the receiving and sending operations. For example, the processing module is configured to perform the operation of performing AH check on the SRv6 packet according to the first indication information and the AH in S202.

In the specification, claims, and accompanying drawings of this application, the terms "first", "second", "third", "fourth", and so on (if existent) are intended to distinguish between similar objects but do not necessarily indicate a specific order or sequence. It should be understood that the data termed in such a way are interchangeable in proper circumstances so that embodiments of the present invention described herein can be implemented in other orders than the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In several embodiments provided in this application, it should be understood that the disclosed system, apparatus, and method may be implemented in other manners. For example, the described apparatus embodiments are merely examples. For example, division into units is merely logical service division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, service units in embodiments of this application may be integrated into one processing unit, or each of the units may exist alone physically, or two or more units may be integrated into one unit. The integrated unit may be implemented in a form of hardware, or may be implemented in a form of a software service unit.

When the integrated unit is implemented in a form of a software service unit and sold or used as an independent product, the integrated unit may be stored in a computer-readable storage medium. Based on such an understanding, technical solutions of this application essentially, or a part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the method in embodiments of this application. The storage medium includes any medium that can store program code, such as a USB flash drive, a removable hard disk, a ROM, a RAM, a magnetic disk, or an optical disc.

Persons skilled in the art should be aware that, in the foregoing one or more examples, services described in the present invention may be implemented by hardware, software, firmware, or any combination thereof. When the present invention is implemented by the software, the services may be stored in a computer-readable medium or transmitted as one or more instructions or code in the computer-readable medium. The computer-readable medium includes a computer storage medium and a communication medium, where the communication medium includes any medium that enables a computer program to be transmitted from one place to another. The storage medium may be any available medium accessible to a general-purpose or a special-purpose computer.

The objectives, technical solutions, and beneficial effects of the present invention have been further described in detail in the foregoing specific implementations. It should be understood that the foregoing descriptions are merely specific implementations of the present invention.

The foregoing embodiments are merely intended for describing the technical solutions of this application instead of limiting this application. Although this application is described in detail with reference to the foregoing embodiments, it should understand that a person of ordinary skill in the art may still make modifications to the technical solutions recorded in the foregoing embodiments or make equivalent replacements to a part of technical features thereof. These modifications or replacements do not make the essence of the corresponding technical solutions depart from the scope of the technical solutions in embodiments of this application.

What is claimed is:

1. A method for verifying a segment routing over Internet Protocol version 6 (SRv6) packet, wherein the method comprises:

receiving, by an egress node of an Internet Protocol security (IPsec) tunnel, an SRv6 packet, wherein the SRv6 packet is a packet encapsulated in an IPsec transport mode, the SRv6 packet comprises an authentication header (AH) and at least one segment routing header (SRH), the SRv6 packet carries first indication information, and the first indication information indicates the egress node to perform AH verification on the SRv6 packet, and wherein the SRv6 packet comprises second indication information, and the second indication information indicates a verification range of the AH verification; and performing, by the egress node, the AH verification on the SRv6 packet based on the first indication information and the AH, wherein the second indication information indicates that the verification range of the AH verification comprises the at least one SRH.

2. The method according to claim 1, wherein the SRH carries the first indication information.

3. The method according to claim 2, wherein a reserved field or an extended type length value (TLV) field of the SRH carries the first indication information.

4. The method according to claim 3, wherein the reserved field is a flag field.

5. The method according to claim 1, wherein a destination address of the SRv6 packet carries the first indication information.

6. The method according to claim 5, wherein an arguments field or a function field of the destination address carries the first indication information.

7. The method according to claim 5, wherein the egress node stores a correspondence between the destination address and the first indication information.

8. The method according to claim 1, wherein the destination address of the SRv6 packet is a second segment identifier (SID), and the second SID is associated with the IPsec tunnel.

9. The method according to claim 8, wherein the second SID is an egress IP address of the IPsec tunnel.

10. The method according to claim 1, wherein the AH comprises the second indication information.

11. The method according to claim 10, wherein a reserved field of the AH carries the second indication information.

12. The method according to claim 1, wherein the performing, by the egress node, the AH verification on the SRv6 packet based on the first indication information and the AH comprises:

performing, by the egress node, the AH verification on the SRv6 packet based on the first indication information, the second indication information, and the AH.

13. The method according to claim 1, wherein the second indication information indicates that the verification range of the AH verification further comprises a payload of the SRv6 packet.

14. The method according to claim 1, wherein the second indication information indicates that the verification range of the AH verification further comprises an IPv6 packet header of the SRv6 packet.

15. The method according to claim 1, wherein the egress node of the IPsec tunnel is an ingress node of an SRv6 trusted domain.

16. The method according to claim 1, wherein the SRv6 packet comprises a plurality of SRHs, and wherein the second indication information indicates that the range of the AH verification comprises the plurality of SRHs.

17. The method according to claim 1, wherein the method further comprises:

forwarding, by the egress node, the SRv6 packet that passes the AH verification; or discarding, by the egress node, the SRv6 packet that fails the AH verification.

18. A method for verifying a segment routing over Internet Protocol version 6 (SRv6) packet, wherein the method comprises:

obtaining, by an ingress node of an Internet Protocol security (IPsec) tunnel, an SRv6 packet, wherein the SRv6 packet is a packet encapsulated in an IPsec transport mode, the SRv6 packet comprises an authentication header (AH) and at least one segment routing header (SRH), the SRv6 packet carries first indication information, the first indication information indicates an egress node of the IPsec tunnel to perform AH verification on the SRv6 packet, wherein the SRv6 packet comprises second indication information, and the second indication information indicates a verification range of the AH verification, and wherein the second indication information indicates that the verification range of the AH verification comprises the at least one SRH; and sending, by the ingress node, the SRv6 packet to the egress node.

19. A network apparatus, used in an egress node of an Internet Protocol security (IPsec) tunnel, comprising:

a communication interface; and a processor, connected to the communication interface, wherein based on the communication interface and the processor, the network apparatus is configured to:

receive a segment routing over Internet Protocol version 6 (SRv6) packet, wherein the SRv6 packet is a packet encapsulated in an IPsec transport mode, the SRv6 packet comprises an authentication header (AH) and at least one segment routing header (SRH) the SRv6 packet carries first indication information, and the first indication information indicates the network apparatus to perform AH verification on the SRv6 packet, and wherein the SRv6 packet comprises second indication information, and the second indication information indicates a verification range of the AH verification; and perform the AH verification on the SRv6 packet based on the first indication information and the AH, wherein the second indication information indicates that the verification range of the AH verification comprises the at least one SRH.

20. The method according to claim 18, wherein the second indication information indicates that the verification range of the AH verification further comprises at least one of:

a payload of the SRv6 packet;

an IPv6 packet header of the SRv6 packet; or a plurality of SRHs comprised in the SRv6 packet.

* * * * *